US012481818B2

United States Patent
Cai et al.

(10) Patent No.: US 12,481,818 B2
(45) Date of Patent: Nov. 25, 2025

(54) READABILITY THEME GENERATION

(71) Applicant: Adobe Inc., San Jose, CA (US)

(72) Inventors: Tianyuan Cai, Toronto (CA); Zoya Bylinskii, Lexington, MA (US); Michael Kraley, Lexington, MA (US); Aleena Niklaus, San Jose, CA (US)

(73) Assignee: Adobe Inc., San Jose, CA (US)

( * ) Notice: Subject to any disclaimer, the term of this patent is extended or adjusted under 35 U.S.C. 154(b) by 354 days.

(21) Appl. No.: 18/168,187

(22) Filed: Feb. 13, 2023

(65) Prior Publication Data

US 2024/0273279 A1    Aug. 15, 2024

(51) Int. Cl.
| | |
|---|---|
| *G06F 40/106* | (2020.01) |
| *G06F 3/0482* | (2013.01) |
| *G06F 3/04847* | (2022.01) |
| *G06V 10/82* | (2022.01) |
| *G06V 30/19* | (2022.01) |

(52) U.S. Cl.
CPC ........ *G06F 40/106* (2020.01); *G06F 3/04847* (2013.01); *G06V 10/82* (2022.01); *G06V 30/19107* (2022.01); *G06V 30/19147* (2022.01); *G06F 3/0482* (2013.01)

(58) Field of Classification Search
CPC .. G06F 40/106; G06F 3/04847; G06F 3/0482; G06V 10/82; G06V 30/19107; G06V 30/19147
See application file for complete search history.

(56) References Cited

U.S. PATENT DOCUMENTS 9,728,096 B2 *   8/2017   DiGiantomasso ..... G06Q 50/20

OTHER PUBLICATIONS

Martinc et al., NPL1 ("Supervised and Unsupervised Neural Approaches to Text Readability" Published Dec. 18, 2020 By Creative Commons Attribution—39 Pages, describing set of novel neural supervised and unsupervised approaches for determining the readability of documents. (39 Pages). (Year: 2020).*
Cha et al., NPL2 ("Language Modeling by Clustering with Word Embeddings for Text Readability Assessment" Published 2017 By ACM—4 Pages, describing a clustering-based language model using word embeddings for text readability prediction . . . (4 Pages). (Year: 2017).*
Ali et al., "Reading on the Computer Screen: Does Font Type has Effects on Web Text Readability?", International Education Studies, vol. 6, No. 3, Jan. 2013, pp. 26-35.
Arditi et al., "Serifs and Font Legibility", Vision Research, vol. 45, Nov. 2005, pp. 2926-2933.
Beier et al., "Increased Letter Spacing and Greater Letter Width Improve Reading Acuity in Low Vision Readers", Information Design Journal, vol. 26, No. 1, Apr. 28, 2021, pp. 73-88.

(Continued)

*Primary Examiner* — Quoc A Tran
(74) *Attorney, Agent, or Firm* — Nicholson De Vos Webster & Elliott LLP

(57) ABSTRACT

Techniques are disclosed for readability theme generation. The techniques include obtaining reading formats and generating reading format digital images based on the obtained reading formats. The reading format digital images are encoded using a trained machine learning model as perceptual embeddings. The perceptual embeddings are clustered into reading format clusters and readability themes are determined based on the reading format clusters.

20 Claims, 18 Drawing Sheets

(56) References Cited

OTHER PUBLICATIONS

Cai et al., "Personalized Font Recommendations: Combining ML and Typographic Guidelines to Optimize Readability", DIS '22: Designing Interactive Systems Conference, Jun. 2022, pp. 1-25.

Chang et al., "Alloy: Clustering with Crowds and Computation", Proceedings of the 2016 CHI Conference on Human Factors in Computing Systems, May 2016, pp. 3180-3191.

Chuang et al., "Interpretation and Trust: Designing Model-Driven Visualizations for Text Analysis", Proceedings of the SIGCHI Conference on Human Factors in Computing Systems, May 5-10, 2012, pp. 443-452.

Dyson, Mary C., "How Physical Text Layout Affects Reading from Screen", Behaviour & Information Technology, vol. 23, No. 6, Nov.-Dec. 2004, pp. 377-393.

Galliussi et al., "Inter-letter Spacing, Inter-word Spacing, and Font with Dyslexia-friendly Features: Testing Text Readability in People with and without Dyslexia", Annals of Dyslexia, vol. 70, No. 1, Mar. 2020, pp. 141-152.

Gasparetti et al., "Exploiting Web Browsing Histories to Identify User Needs", IUI '07, Proceedings of the 12th international Conference on Intelligent user Interfaces, Jan. 2007, pp. 325-328.

Grudin, Jonathan, "Managerial Use and Emerging Norms: Effects of Activity Patterns on Software Design and Deployment", 37th Annual Hawaii International Conference on System Sciences, 2004, 10 pages.

Korinth et al., "Wider Letter-Spacing Facilitates Word Processing but Impairs Reading Rates of Fast Readers", Frontiers in Psychology, vol. 11, Article 444, Mar. 17, 2020, pp. 1-17.

Marinus et al., "A Special Font for People with Dyslexia: Does it Work and, if so, why?", Dyslexia, vol. 22, No. 3, May 2016, pp. 233-244.

Minakata et al., "The Effect of Font Width on Eye Movements during Reading", Applied Ergonomics, vol. 97, Nov. 2021, 7 pages.

Nebeling et al., "XRStudio: A Virtual Production and Live Streaming System for Immersive Instructional Experiences", CHI '21, Proceedings of the 2021 CHI Conference on Human Factors in Computing Systems, Article No. 107, May 2021, pp. 1-12.

O'Donovan et al., "Exploratory Font Selection Using Crowdsourced Attributes", ACM Transactions on Graphics, vol. 33, No. 4, Article No. 92, Jul. 27, 2014, pp. 1-9.

Preston et al., "Redefining Class Definitions using Constraint-Based Clustering", KDD '10, Proceedings of the 16th ACM SIGKDD International Conference on Knowledge Discovery and Data Mining, Jul. 2010, pp. 823-832.

Pruitt et al., "Personas: Practice and Theory", DUX '03, Proceedings of the 2003 Conference on Designing for User Experiences, Jun. 2003, pp. 1-15.

Rello et al., "How to Present More Readable Text for People with Dyslexia", Universal Access in the Information Society, vol. 16, 2017, pp. 29-49.

Reyonalds et al., "'You Can't See what the Words Say': Word Spacing and Letter Spacing in Children's Reading Books", Journal of Research in Reading, vol. 27, No. 1, Feb. 2004, pp. 87-98.

* cited by examiner

FIG. 8

By the side of a wood, in a country a long way off, ran a fine stream of water; and upon the stream there stood a mill. The miller's house was close by, and the miller, you must know, had a very beautiful daughter. She was, moreover, very shrewd and clever; and the miller was so proud of her, that one day told the king of the land, who used to come and hunt in the wood, that his daughter could spin gold out of straw. Now this king was very fond of money; and when he heard the miller's boast his greediness was raised, and he sent for the girl to be brought before him. Then he led her to a chamber in his palace where there was a great heap of straw, and gave her a spinning-wheel, and said, 'All this must be spun into gold before morning, as you love your life.' It was in vain that the poor maiden said that it was only a silly boast of her father, for that she could do no such thing as spin straw into gold: the chamber door was locked, and she was left alone.

She sat down in one corner of the room, and began to bewail her hard fate; when on a sudden the door opened, and a droll-looking little man hobbled in, and said, 'Good morrow to you, my good lass; what are you weeping for?' 'Alas!' said she, 'I must spin this straw into gold, and I know not how.' 'What will you give me,' said the hobgoblin, 'to do it for you?' 'My necklace,' replied the maiden. He took her at her word, and sat himself down to the wheel, and whistled and sang:

READABILITY THEME GENERATION

BACKGROUND

Text format settings other than the font size with respect to text presented by reading applications on computer video displays can affect the readability of that text. Consider an example of a reading application that allows the user to customize their reading experience by selecting font, line spacing, word spacing, and character spacing through separate graphical user interface controls. Different users may prefer different text format settings and different text format settings may be optimal for different users with respect to reading comfort, comprehension, and speed. However, aside from increasing font size to be more legible, users may not know which other text format settings may affect their reading the most. Further, text format settings are interrelated. Adjustments to character spacing, for example, may require further adjustments to word or line spacing to feel comfortable. Continually tweaking or tuning graphical user interface controls to discover the optimal text format settings may be tedious, time-consuming, frustrating, or overwhelming for users.

SUMMARY

Techniques are provided for readability theme generation. The techniques balance the need for text format setting diversity with the need for ease of text format setting configuration, using a processing of individual text format setting combinations (equivalently "reading formats") used among a cohort of users. At each processing of a grouping of reading formats, machine learning is used to generate one or more "perceptual" embeddings for each reading format that represents how the reading format is visually perceived. The perceptual embeddings are clustered. Each cluster includes perceptual embeddings representing perceptually similar reading formats. A representative reading format (equivalently a "readability theme") is determined from each cluster. Each readability theme is a bundle of text format settings. The generated readability themes are presented by a reading application as user selectable options. When a readability theme is selected, the reading application formats text presented by the reading application in accordance with the bundle of text format settings of the readability theme.

Additional features and advantages of exemplary embodiments of the present disclosure are set forth in the description which follows, and in part will be apparent from the description, or may be learned by the practice of such exemplary embodiments.

BRIEF DESCRIPTION OF THE DRAWINGS

The detailed description is described with reference to the accompanying drawings in which:

FIG. 8 illustrates how fonts can vary in perceptual size even when displayed at the same font size and spacing settings, according to an embodiment.

FIG. 10 illustrates an example of random locations of digital image crops extracted from a digital image screenshot of a document containing text, according to an embodiment.

FIG. 15 depicts an example of clustering reading formats, according to an embodiment.

DETAILED DESCRIPTION

Figure 1:
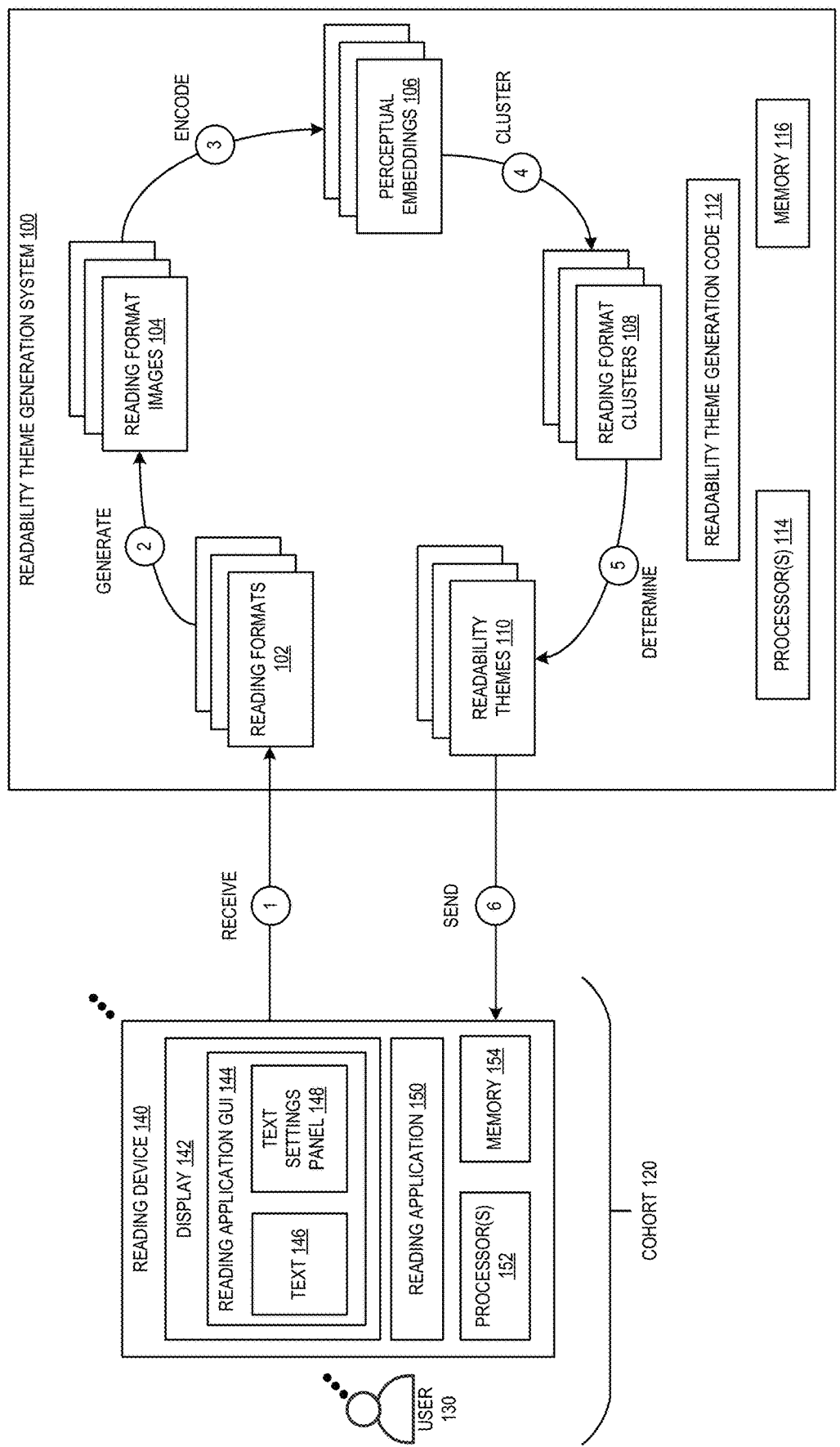
FIG. 1 illustrates a system and method for readability theme generation, according to an embodiment.

Various text format settings can affect the readability of text presented by reading applications. Unfortunately, there is no one set of text format settings that all users prefer on all types of reading devices. So, diversity is needed. Along with the need for text format setting diversity, there is a need for ease of text format setting configuration.

Conventional approaches for recommending text format settings provide users with fine-grained control. For example, a conventional reading application may provide separate graphical user interface controls for individually selecting, font, line spacing, word spacing, and character spacing. However, users may find continually tweaking or tuning graphical user interface controls to discover the optimal text format settings tedious, time-consuming, frustrating, or overwhelming. For example, adjustments to character or word spacing can change the look and feel of text which may require compensatory adjustments to other spacing or font settings. Such nuanced refinement in continuous text setting may be challenging for users. For example, conventional approaches may offer a sorted list of fonts with little or no guidance on which fonts work best with which line, word, or character spacings and for which users.

The techniques disclosed herein balance the need for text format setting diversity with the need for ease of text format setting configuration, using a processing of individual text format setting combinations (equivalently "reading formats") used among a cohort of users. At each processing of a grouping of reading formats, machine learning is used to generate one or more "perceptual" embeddings for each reading format that represents how the reading format is visually perceived. The perceptual embeddings are clustered. Each cluster includes perceptual embeddings representing perceptually similar reading formats. A representative reading format (equivalently a "readability theme") is determined from each cluster. Each readability theme is a bundle of text format settings. The generated readability themes are presented by a reading application as user selectable options. When a readability theme is selected, the reading application formats text presented by the reading application in accordance with the bundle of text format settings of the readability theme.

As an example of the problem addressed by the techniques disclosed herein, consider a cohort of users with diverse reading format preferences using reading applications on different reading device types. A reading application may provide a graphical user interface panel that allows a user to individually configure several different text format settings according to their preference such as font, font size, line height, character spacing, word spacing, paragraph indent, paragraph spacing, column width, text alignment, color theme, contrast, and dark mode. Aside from increasing font size to be more legible, users may not know which text format settings may affect their reading the most. Moreover, many of the text format settings are interrelated, where adjustments to one text format setting (e.g., character spacing) may require further adjustments to other text format settings (e.g., word or line spacing) to feel comfortable. With so many text format settings options to configure, users are confronted with a bewildering task of tweaking and tuning multiple graphical user interface controls until they happen on a reading format suitable to them.

The techniques disclosed herein provide a better text formatting experience. To bring users closer to reading formats that are best for them, the techniques discover from among many individual reading formats a small number (e.g., two to twenty) bundles of text format settings (readability themes) to offer users as starting points for their custom reading formats or to use as is. The offered readability themes both fit (are more representative of) diverse users' reading format preferences and are well-designed for use in reading applications.

According to an embodiment, a machine learning approach is used in which, among many individual reading formats used among a cohort of users, a small set of readability themes are determined. Each readability theme is a bundle of text format settings that is representative of a cluster of similar reading formats identified among the individual reading formats. Those readability themes can be presented as selectable options on a graphical user interface panel of a reading application. A user may select a readability theme for formatting text presented by the reading application. The user may accept the text formatting applied by the selected readability theme or use the selected readability theme as a starting point for fine tuning individual text format settings.

The process of deriving readability themes from reading formats may be performed periodically over time to evolve the set of readability themes with changes in the reading format preferences or the reading ability of users. For example, the set of selectable readability themes may evolve over time as users age or as their reading ability improves.

The techniques proceed by receiving batched data from many previous reading formats used among a cohort of users. For example, tens or hundreds of users of different ages (e.g., children learning to read, adults, and old age persons), different reading abilities (e.g., some with dyslexia and some without), and using different types of reading devices (e.g., mobile devices, laptop computers, and desktop computers) may use reading applications (e.g., document reading applications or web browser applications) to select different sets of individual text format settings (reading formats) according to their diverse text formatting preferences.

The batched data may be processed at one time using machine learning to generate perceptual embeddings for the different reading formats. The perceptual embeddings may have the property that more similar embeddings according to a similarity metric (e.g., cosine similarity) represent more perceptually similar reading formats and less similar embeddings according to the similarly metric represent less perceptually similar reading formats. The perceptual embeddings may be clustered into relatively few clusters where the perceptual embeddings in each cluster represent perceptually similar reading formats and each cluster represents a perceptually distinct reading format.

A representative reading format (readability theme) may be generated from each cluster (e.g., based on the centroid of the cluster). For example, three different readability themes might be derived from the batched data with increasing character, word, and line spacing across the three readability themes. The readability theme with the most compact character, word, and line spacing might be preferred by some young professionals in the cohort, the readability theme with a more open spacing might be preferred by most users in the cohort, and the readability theme with the most relaxed spacing might be preferred by some dyslexic users in the cohort.

The techniques herein may rely on using a convolutional neural network (CNN) to generate the perceptual embeddings from digital images of the reading formats applied to text to leverage the convolutional layers of the CNN and the consequent ability of the CNN to learn spatial hierarchies of visually perceptual features in the digital images.

Embodiments provide several technical advantages over existing solutions. Disclosed embodiments cluster documents based on their perceptual visual characteristics in terms of text format settings applied to document text. This has the advantage over approaches that attempt to cluster documents using the values of the text format settings as features for clustering. With these approaches, it may not be clear how to weight these different features, as they have different effects on the appearance of the reading format. On the other hand, disclosed embodiments form more interpretable clusters based on how different reading formats are visually perceived by using screenshots of the reading formats. Another technical advantage of some embodiments is that documents are clustered based on fine-grained visually perceptual text formatting features and the clustering is robust to content and page-level layout variations. Yet another technical advantage of some embodiments is that commonly applied text format settings are bundled together to create presets that offer distinct document reading experiences. Whereas current reading application offer individual control of text format settings which, as discussed above, can be tedious, frustrating, or overwhelming for users.

FIG. 1 illustrates a system and a method for readability theme generation, according to an embodiment. In summary, the system includes readability theme generation computer system 100. System 100 includes readability theme generation code 112. Code 112 encompass instructions and data for performing the steps of the method. Code 112 is stored in memory 116 of system 100 and executed by one or more processors 114 of system 100 to perform the method.

The system also encompasses one or more reading devices used by one or more users in a cohort 120. Representative reading device 140 is used by user 130 in the cohort 120. Reading device 140 includes or is operatively coupled to video display 142. Display 142 presents reading application graphical user interface (GUI) 142. GUI 142 encompasses text 146 and text format settings panel 148. Reading device 140 executes reading application 150 by way of one or more processors 152 and memory 154 of reading device 140.

Steps of the method are depicted in FIG. 1 by numbered circles that overlay directed arrows. The directed arrows represent a direction of data flow between connected components but not necessarily the exclusive direction. The method may be performed by system 100 as a result of processor(s) 114 executing code 112 stored in memory 116.

In summary, the method proceeds at Step 1 by receiving reading formats 102 used by users in cohort 120. At Step 2, reading format digital images 104 are generated from reading formats 102. At Step 3, reading format images 104 are encoded as perceptual embeddings 106. At Step 4, perceptual embeddings 106 are clustered into reading format clusters 108. At Step 5, readability themes 110 are determined from reading format clusters 108. At Step 6, readability themes 110 are sent to reading devices which may include reading devices in cohort 120 but can include reading devices used by users not in cohort 120. Thus, reading formats 102 of cohort 120 can be used to generate representative readability themes 110 that can be used by a broader set of users.

As an example, consider the batch processing of reading formats used by users in a cohort. The cohort may have diverse reading format preferences. Users in the cohort may span age ranges from children learning to read, to young adults, to old age persons. Some users in the cohort may be reading text in a second language to them. Some users may have dyslexia. Some users may be reading text on relatively small screen reading devices such as mobile phones while others are reading text on relatively large screen reading devices such as those of laptop or desktop computers. Some users may be struggling readers. Some readers may be reading for comfort (causally), others for speed (e.g., to get the gist), and others for comprehension (e.g., to acquire a deep understanding). The text format settings that are applied to text read by users may influence how successful the reading experiences are for those users in terms of reading comfort, speed, and comprehension. The system and method depicted in FIG. 1 may be used to derive a set of readability themes that are representative of the diverse reading format preferences of the users in the cohort.

As another example, the system and method may provide users with graphical user interface controls (e.g., a drop-down list, a set of check boxes, a set of option buttons, etc.) for selecting a readability theme from among a set of readability themes. A user may select a particular readability theme using the controls and the text format settings bundled with the particular readability theme can be applied to text that the user is reading. The system and method may be used to determine the appropriate set of readability themes to present as selectable options via such controls.

In many of the examples herein, the set of readability themes are provided as user selectable options via graphical user interface controls of a reading application. Additionally or alternatively, the set of readability of themes may be used for other purposes. For example, the set of readability themes may be used to determine a set of default text format settings to configure a reading application with (e.g., a web browser or an operating system). As another example, the set of readability themes may be used to assess the reading ability of users in a cohort. For example, a readability theme with large character, word, and line spacing may indicate that a significant number of users in the cohort are learning to read, are old age, or have dyslexia.

Returning to the top of the method of FIG. 1, at Step 1, a set of reading formats 102 is received from a set of reading devices used by a cohort 120 of users. Reading device 140 is generally representative of any reading device in the set of reading devices. User 130 is generally representative of any user in the cohort 120 of users.

A reading format encompasses a set of text format settings that are used by a user (e.g., 130) when reading text (e.g., 146) presented by a reading application (e.g., 150) on a reading device (e.g., 140). The set of text format settings used by the user may encompass various different text format settings such as any or all of: font, font size, line height, character spacing, word spacing, paragraph ident, paragraph spacing, text alignment, column width, color theme, contrast, and dark mode.

A font refers to a set of characters that share a common design. The reading application may support may different fonts, each with its own distinct style and characteristics. Sone fonts may be designed to be easy to read, while others may be more decorative and ornate. A serif font is a common font. Serif fonts (e.g., Times, Source Serif Pro, Georgia, Merriweather, etc.) have small lines or embellishments at the end of the characters. Non-serif or sans-seif fonts (e.g., Helvetica, Roboto, Arial, OpenSans, Poppins, etc.) do not have these embellishments. Font can significantly affect readability due to variability in the characteristics of different fonts such as font weight, stroke contrast, and character width. The increase in spacing of serif fonts can have a positive effect on readability. Different fonts and different font characteristics affect different users differently. There may be no "one-size-fits-all" font for a user cohort. In some embodiments, font is a text format setting that is selected by a reading format 102 when generating reading format images 104 at Step 2.

Font size refers to the size of the characters of the text. A font size is typically measured in pixels or points where one pixel is assumed to be $\frac{1}{96}^{th}$ of an inch and one point is assumed to be $\frac{1}{72}^{nd}$ of an inch. Typically, the larger the font size, the more prominent and easier it is to read the text. In some embodiments, font size is a normalized text format setting across all reading formats 102 when generating reading format images 104 at Step 2. This normalization is done to reduce or eliminate confounds with the optimal font size and viewing distance, screen size, and screen resolution. For example, the font size can be normalized at 16 px.

Character spacing refers to the horizontal space between individual characters in a line or block of text that sets the visual character density of the line or block of text. Character spacing is distinct from kerning which is used in certain situations between certain pairs of characters as defined in a font. Increasing character spacing can make text easier to read. For example, larger character spacing may benefit users with dyslexia, with low vision, or those reading unfamiliar content. However, larger character spacing may be preferred by other users (e.g., non-dyslexic users). Character spacing (and other text format settings) can be specified in EM units. "EM" is a unit of measurement used to describe the size of a font. One EM is equal to the current font size. For example, if the current font size is 16 px, then one EM is equal to 16 px. A reading application may allow a user to adjust the character spacing (e.g., on text format settings panel 148). A default character spacing setting is normal, meaning there is a standard amount of horizontal space between characters. The character spacing can be increased or decreased from the default to make text more compact or easier to read. In some embodiments, character spacing is a text format setting that is selected by a reading format 102 when generating reading format images 104 at Step 2. For example, the character spacing can be a specified number of EM units (e.g., a value between 0 and 0.05 EM units).

Word spacing refers to the horizontal space between words in a line or block of text that sets the visual word density of the line or block of text. Word spacing can be specified in EM units (e.g., a value between 0 and 0.4 EM units). Word spacing can affect the readability and legibility of text, as well as the overall layout and appearance of the text. For example, larger word spacing may improve readings outcomes in children. The relationship between character and word spacing may also affect readability. For example, an increase in word spacing that is proportional to an increase in character spacing may be preferred by some users. A reading application may allow a user to adjust the word spacing (e.g., on text format settings panel 148). A default word spacing setting is normal, meaning there is a standard amount of horizontal space between words. The word spacing can be increased or decreased from the default to make text more compact or easier to read. In some embodiments, word spacing is a text format setting that is selected by a reading format 102 when generating reading format images 104 at Step 2. For example, the word spacing can be a specified number of EM units (e.g., a value between 0 and 0.4 EM units). It should be noted that word spacing may not be uniform depending on whether the text is justified. In some embodiments, when generating reading format images 104 at Step 2, text is left-aligned or otherwise aligned or justified such that there is uniform word spacing.

Line spacing refers to the amount of vertical spacing between lines of text. Line spacing can be used to improve the readability of text, as it helps to separate lines of text. In particular, larger line spacing helps users better focus on the line they are reading and reduces the probability of inadvertently moving focus to an adjacent line. A reading application may allow a user to adjust the line spacing with line spacing options in a formatting menu (e.g., on text format settings panel 148). The default line spacing is typically set to single spacing. Line spacing can be specified as a multiple of the default spacing between lines of text. Increasing the line spacing can make text easier to read. In some embodiments, line spacing is a text format setting that is selected by a reading format 102 when generating reading format images 104 at Step 2. For example, the line spacing can be specified as a multiple of single spacing (e.g., a value between 1.0 and 3.0).

Paragraph indent refers to an amount of horizontal blank space at the beginning of a paragraph of text to visually set it apart from the rest of the text. The paragraph indent can be specified as a number of space or tab characters (e.g., on text format settings panel 148). Paragraph indent helps to visually organize a document and can make it easier to read. However, paragraph indent may not affect readability to the same degree as font, character spacing, line spacing, or word spacing. In some embodiments, paragraph indent is a normalized text format setting across all reading formats 102 when generating reading format images 104 at Step 2 as paragraph indent may have less effect on readability than font, word spacing, character spacing, or line spacing. For example, paragraph indent can be normalized at no indent, two space characters, a single tab character, or other default paragraph indent setting.

Paragraph spacing refers to the amount of vertical space that appears between paragraphs of text. By default, a reading application may add a small amount of paragraph spacing to visually separate them and improve readability. The reading application may allow a user to adjust the paragraph spacing of text by using paragraph spacing options in a formatting menu (e.g., on text format settings panel 148). Increasing the paragraph spacing can make text easier to read, while decreasing the paragraph spacing can make text more concise and compact. However, paragraph spacing may not affect readability to the same degree as font, character spacing, line spacing, or word spacing. In some embodiments, paragraph spacing is a normalized text format setting across all reading formats 102 when generating reading format images 104 at Step 2 as paragraph spacing may have less effect on readability than font, word spacing, character spacing, or line spacing. For example, the paragraph spacing can be normalized to a default paragraph spacing.

Column width refers to the amount of horizontal space that is allotted for a single column of text. A reading application may allow for adjustment of the column width such as in column formatting options in a layout menu (e.g., on text format settings panel 148). In some embodiments, column width is a normalized text format setting across all reading formats 102 when generating reading format images 104 at Step 2 as there may be a lack of consistent pattern in users' preferences for column width and column width tends to be dependent on reading context and content.

Text alignment refers to the way in which text is arranged. There are four main types of text alignment: left-aligned, right-aligned, center-aligned, and justified. In left-aligned text, the text is aligned along the left margin and the right margin is ragged. Right-aligned text is aligned along the right margin and the left margin is ragged. Center-aligned text is aligned along the center of the page or screen, with an even margin on both the left and right sides. Justified text is aligned along both the left and right margins, with the text spaced out evenly across the page or screen. Justified text alignment can make the text easier to read, but it can also create large gaps between words if the text is not justified properly. Text alignment may not affect readability to the same degree as font, character spacing, line spacing, or word spacing. In some embodiments, text alignment is a normalized text format setting across all reading formats 102 when generating reading format images 104 at Step 2 as text alignment may have less effect on readability than font, word spacing, character spacing, or line spacing. For example, text alignment can be normalized as left-aligned.

Color theme refers to the color of the text as distinct from the color of the background on which the text is displayed. Contrast refers to the difference in visual properties between the text and the background on which it is displayed. Generally, higher contrast makes text easier to read and more visually appealing. For example, black text on white background has high contrast, while light grey text on a white background has low contrast. In some embodiments, color theme and contrast are a normalized text format setting across all reading formats 102 when generating reading format images 104 at Step 2 as there may be a lack of consistent pattern in users' preferences for color theme and contrast and color them and contrast tend to be dependent on reading context and content. For example, the color theme can be normalized to black text on white background at a default or standard contrast setting.

Dark mode is a feature of some reading applications for switching the color scheme of presented text from a light background (black letters on white background) to a dark one (light-colored text and dark background). The goal of dark mode is to reduce the strain on the user's eyes, especially in low light environments, and to conserve battery life. A reading application may offer a dark mode option, which can be enabled by the user in a text format settings menu (e.g., on text format settings panel 148). In some embodiments, dark mode is a normalized text format setting across all reading formats 102 when generating reading format images 104 at Step 2 as there may be a lack of consistent pattern in users' preferences for dark mode and dark mode setting tends to be dependent on reading context and content. For example, dark mode can be normalized to "off" (e.g., dark text on light background).

In the above description of possible text format settings, the horizontal refers to a plane parallel with the direction in which the text is read and vertical refers to a plane perpendicular to the horizontal as just defined.

Figure 2:
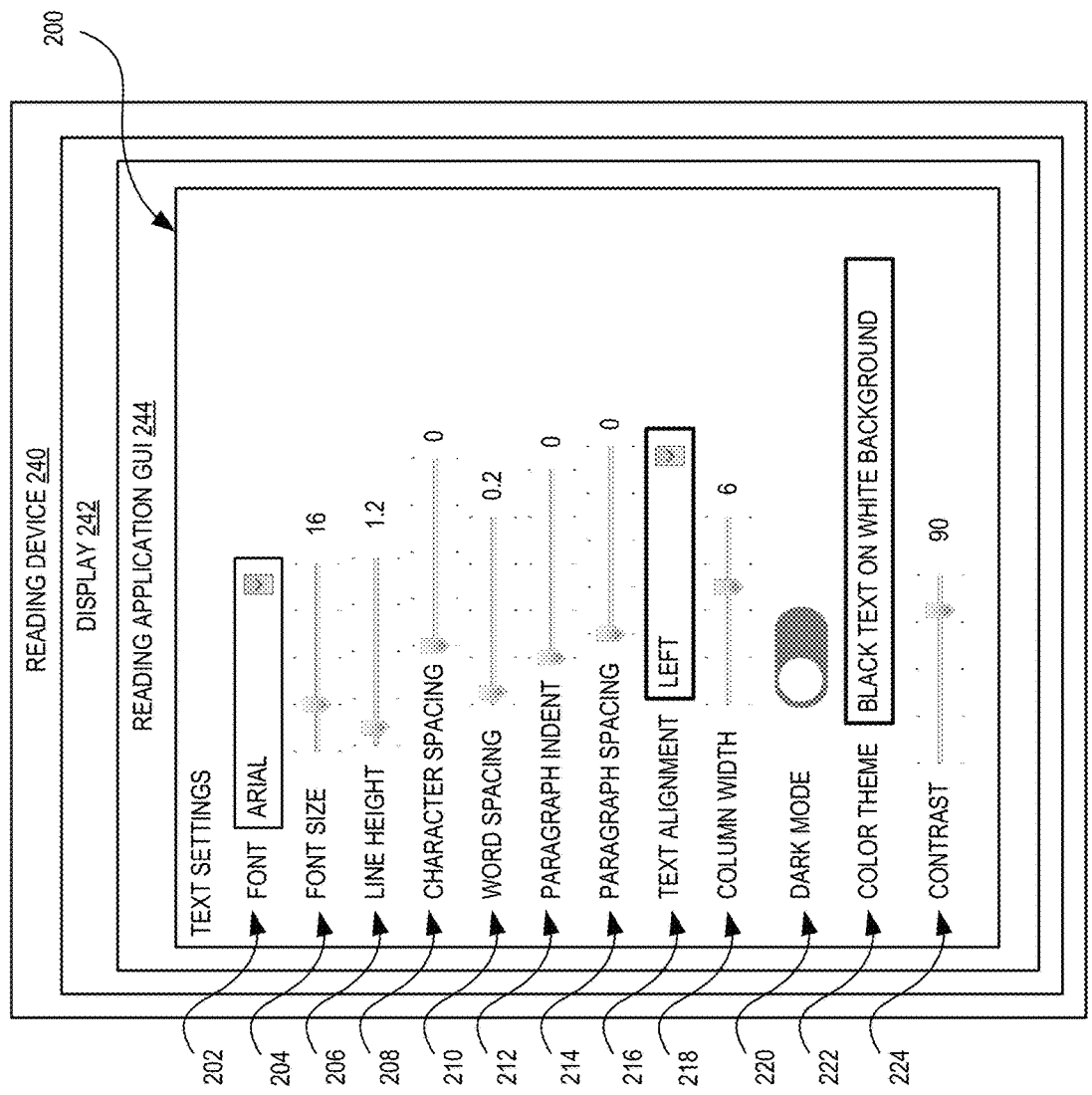
FIG. 2 depicts an example of a graphical user interface text format settings panel of a reading application displayed on a video display of or operatively coupled to a reading device, according to an embodiment.

Turning briefly to FIG. 2, it depicts an example of a text format settings panel 200 of a reading application GUI 244 displayed on a display 242 of or electrically coupled to a reading device 240, according to an embodiment. Example panel 200 includes various graphical user interface controls allowing the user to configure text format settings. The controls include drop-down selection controls 202 for selecting a font, slider controls 204 for selecting a font size, slider controls 206 for selecting a line spacing, slider controls 208 for selecting a character spacing, slider controls 210 for selecting a word spacing, slider controls 212 for selecting a paragraph indent, slider controls 214 for selecting a paragraph spacing, drop-down selection controls 216 for selecting a text alignment, slider controls 218 for selecting a column width, toggle controls 220 for selecting whether dark mode is activated or not, drop-down selection controls 222 for selecting a color theme, and slider controls 224 for selecting a contrast setting.

Figure 3:
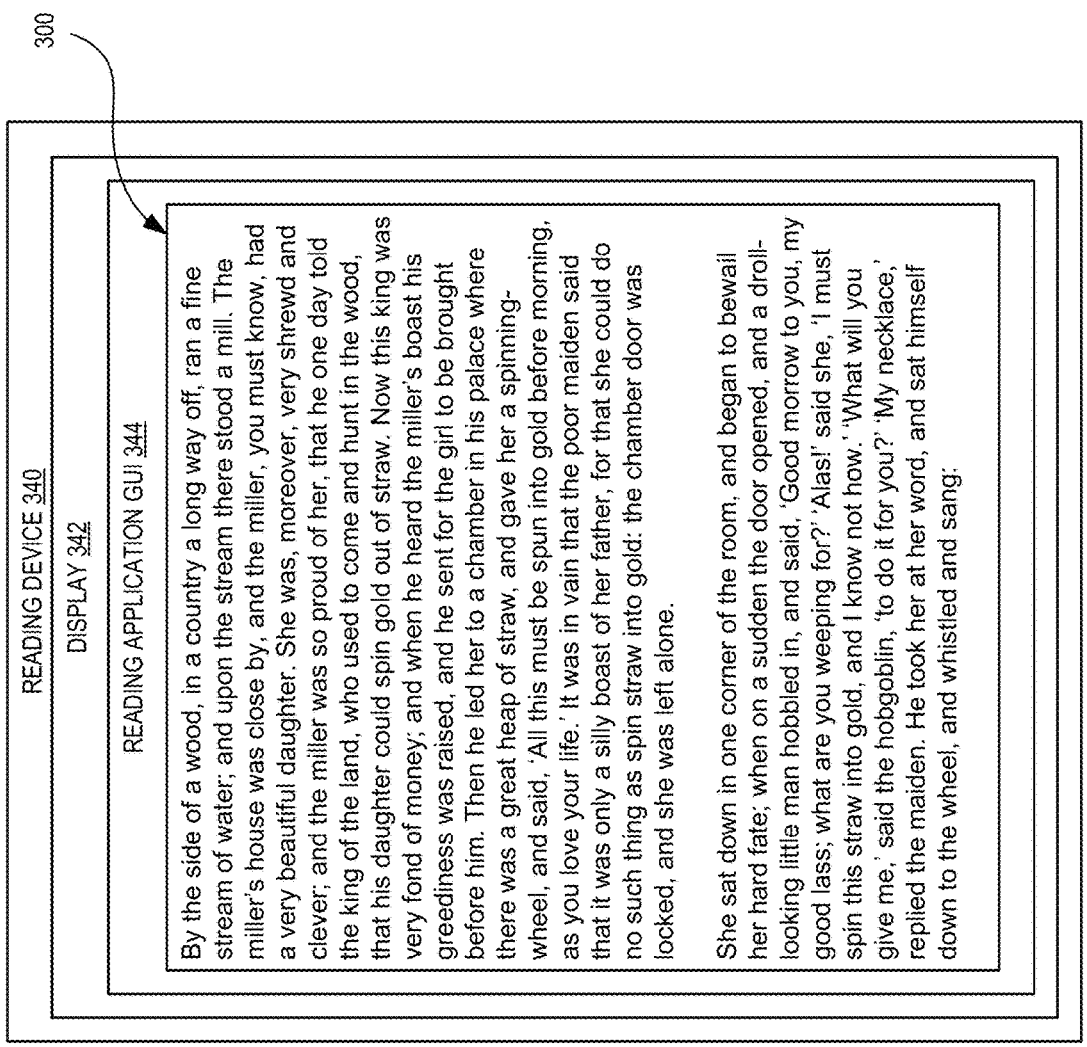
FIG. 3 depicts an example of formatted text displayed in a graphical user interface of a reading application displayed on a video display of or operatively coupled to a reading device, according to an embodiment.

Different reading applications may provide a different sets of text format settings controls. For example, a reading application may provide a superset of the controls depicted in FIG. 2, a subset of those controls, or a superset thereof. Furthermore, while a reading application may provide text format setting controls on a single GUI panel such as depicted in FIG. 2, a reading application can alternatively offer text format setting controls across a set of different GUI panels, menu, or other GUI widgets. FIG. 3 depicts an example of formatted text 300 of a reading application GUI 344 displayed on a display 342 of or electrically coupled to a reading device 340, according to an embodiment. For example, text 300 may be formatted according to the text format settings selected on panel 200 of FIG. 2.

Some or all the set of text format settings used by the user may include default text format settings that are provided as defaults by the reading application that the user does not change using the text format settings panel (e.g., 148). Some or all the set of text format settings used by the user may include user-specified text format settings that are selected by the user using graphical user interface controls of the text format settings panel. The text format settings panel can provide individual controls for configuring individual text format settings, controls for selecting a readability theme, or both individual controls for configuring individual text format settings and controls for selecting a readability theme.

The user can select the set of text format settings using only the individual controls for configuring individual text format settings, using only the controls for selecting a readability theme, or using both the individual controls for configuring individual text format settings and the controls for selecting a readability theme. For example, the user may use the controls for selecting a readability theme to select a particular readability theme and then use one or more individual controls for fine tuning one or more individual text format settings to arrive at the set of text format settings.

Figure 4:
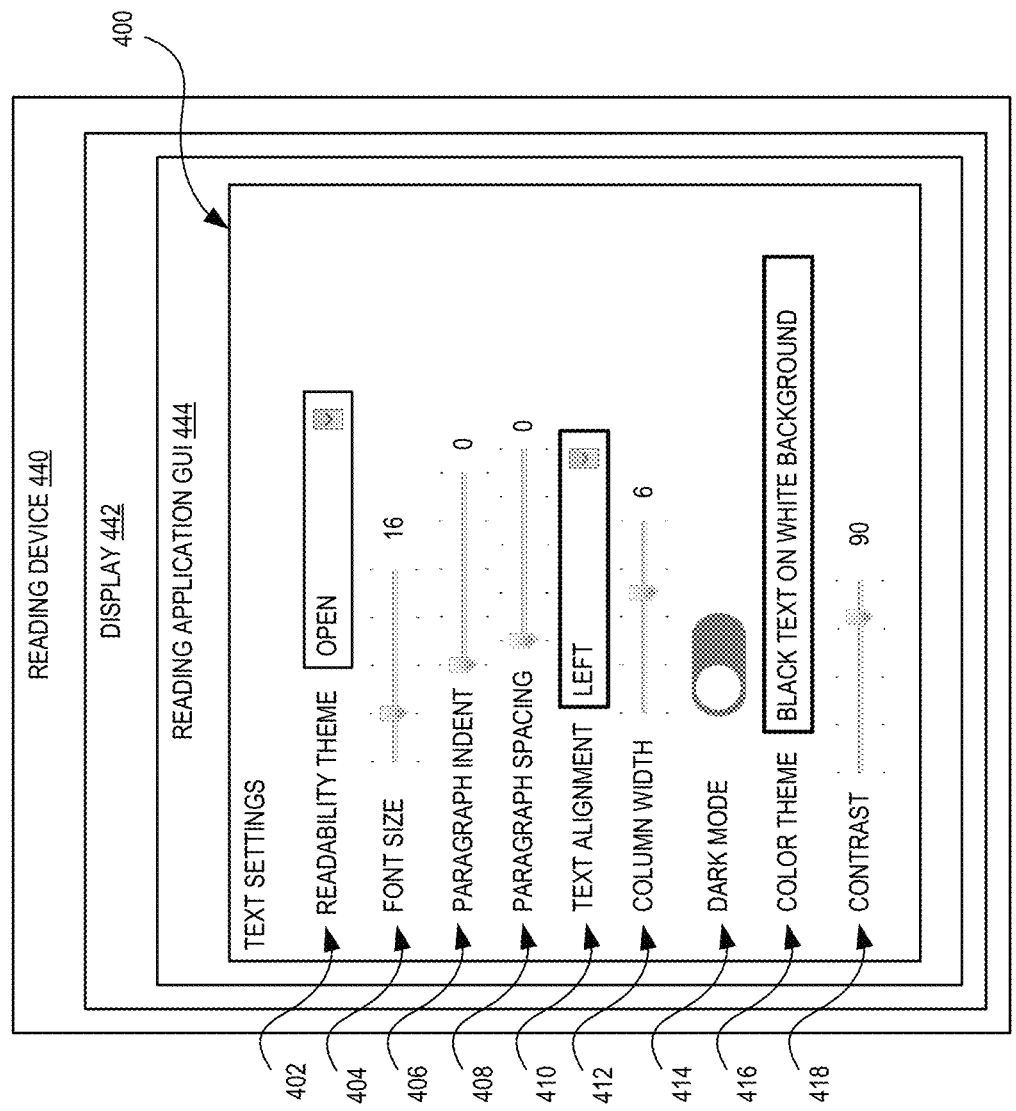
FIG. 4 depicts another example of a graphical user interface text format settings panel of a reading application displayed on a video display of or operatively coupled to a reading device, according to an embodiment.

Turning now to FIG. 4, it depicts an example of a text format settings panel 400 of a reading application GUI 444 displayed on a display 442 of or electrically coupled to a reading device 440, according to an embodiment. In example panel 400, individual controls for selecting font, line spacing, character spacing, and word spacing are not provided like with example panel 200 of FIG. 2. Instead, drop-down selection controls 402 are provided on panel 400 in place of font selection controls 202, line spacing selection controls 206, character spacing selection controls 208, and word spacing selection controls 210.

Figure 5:
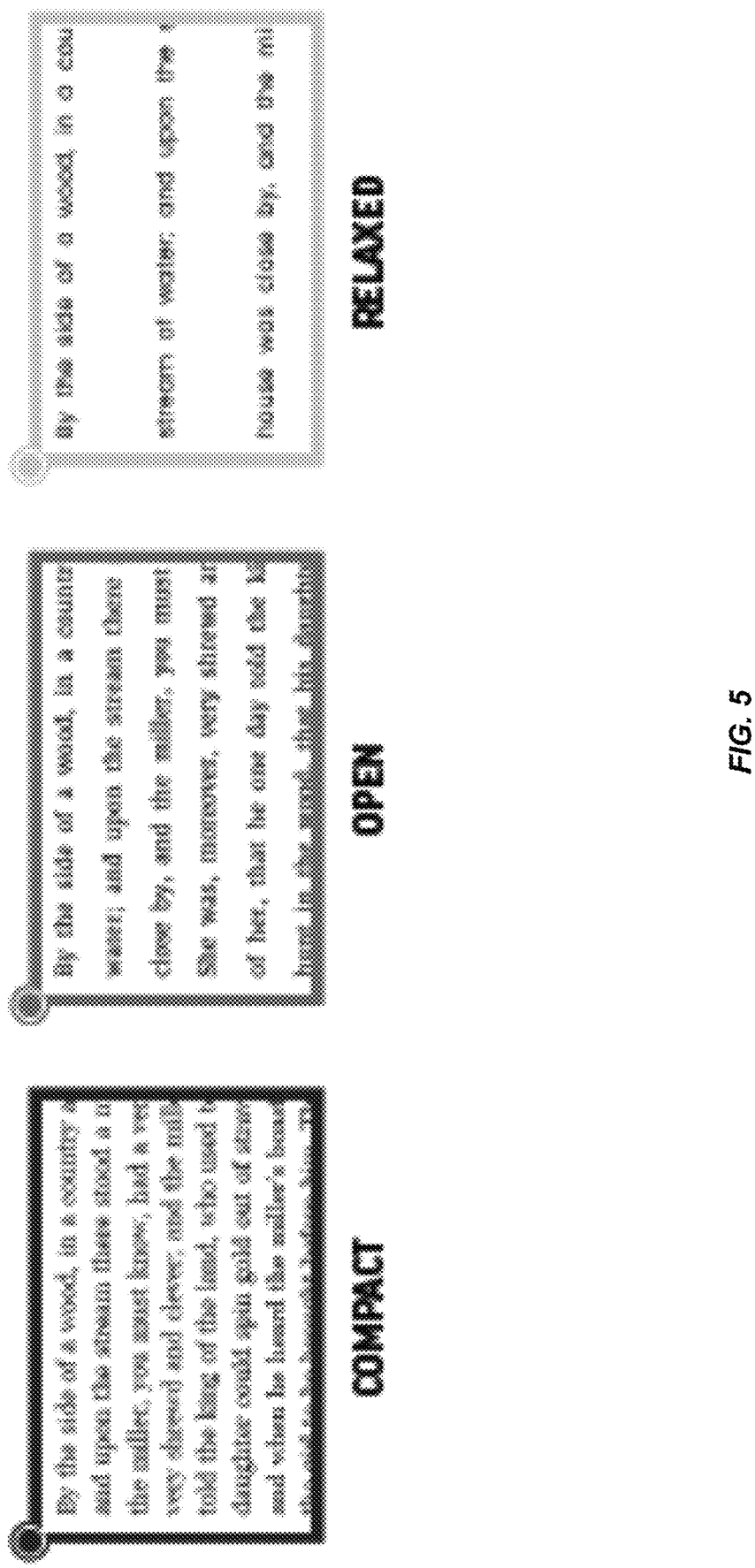
FIG. 5 depicts example readability themes, according to an embodiment.

Controls 402 are for selecting a readability theme from among a set of readability themes. Each selectable readability theme encompasses a different combination of font, line spacing, character spacing, and word spacing settings. For example, controls 402 might allow the user to select from among a "compact" readability theme, an "open" readability theme, and a "relaxed" readability theme. For example, the "compact" readability theme might encompass a combination of the Georgia font, a 0.01 EM character spacing, a 0 EM word spacing, and a 1.4 line spacing. The "open" readability theme might encompass a combination of the Merriweather font, a 0.02 EM character spacing, a 0.2 EM word spacing, and a 2.2 line spacing. The "relaxed" readability theme might encompass the Poppins font, 0.03 EM character spacing, 0.4 EM word spacing, and a 4.5 line spacing. Panel 400 also provides other controls 404, 406, 408, 410, 412, 414, 416, and 418 for setting other text format settings other than font, line spacing, character spacing, and word spacing that are controlled by the readability theme selected via controls 402. FIG. 5 depicts the example compact, open, and relaxed readability themes with the respective font, line spacing, character spacing, and word spacing described above.

Figure 6:
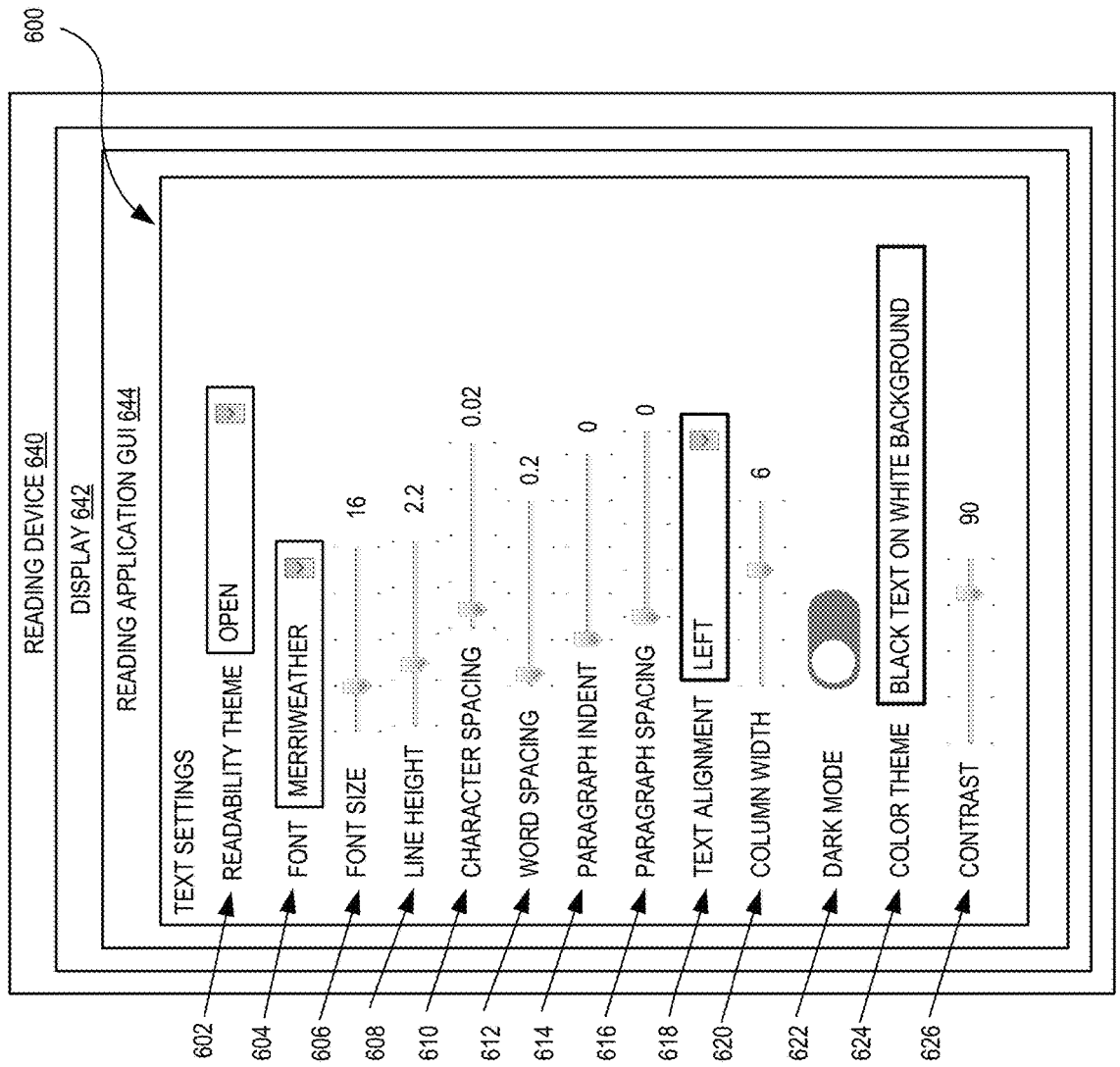
FIG. 6 depicts yet another example of a graphical user interface text format settings panel of a reading application displayed on a video display of or operatively coupled to a reading device, according to an embodiment.

Turning next to FIG. 6, it depicts an example of a text format settings panel 600 of a reading application GUI 644 displayed on a display 642 of or electrically coupled to a reading device 640, according to an embodiment. In example panel 600, drop-down selection controls 602 selecting a readability theme are provided on panel 600 like in panel 400 of FIG. 4 in addition to individual controls for selecting text format settings as provided on panel 200 of FIG. 2. Thus, with panel 600, the user can select a readability theme using controls 602 which will set the font, the line spacing, the character spacing, and the word spacing according to the selected readability theme. Then, the user can individually adjust those text format settings and other text format settings using the selected readability theme as a starting point. In the example of FIG. 6, the "open" readability theme is selected using controls 602. Consequently, the Merriweather font is automatically selected via controls 604, a line spacing of 2.2 EM is automatically selected via controls 608, a character spacing of 0.02 EM is automatically selected via controls 610, and a word spacing of 0.2 EM is automatically selected via controls 612.

Returning now to FIG. 1, when the user uses a particular reading format to read text presented by the reading application, the reading application can record the set of text format settings used. For example, the reading application can record the particular reading format in a log file, database, or in-memory (e.g., 154) buffer at the reading device. The record can include the values of the text format settings used. The record can also include metadata about the use such as any or all of: an identifier of the user (user identifier), an identifier of the document containing the formatted text (document identifier), an identifier of the type of reading device (reading device type), and a date or time of the use (timestamp). The user identifier can be a user account identifier, an e-mail address, or other user identifier. The document identifier can be a Uniform Resource Locator (URL), a file name, or other document identifier. The reading device type can indicate the type of reading device used. For example, one type of reading device can be "mobile" to indicate a portable reading device such as a mobile phone or tablet device having a relatively small display screen. Another type of reading can be "web" to indicate a reading device with a relatively larger display screen such as a laptop computer or a desktop computer. The types "mobile" and "web" can also indicate the type of reading application. A reading device type of "mobile" may correspond to configuration where the reading application on the reading device is a mobile application or mobile "app" such as one downloaded from application store or "app store" or the like. A reading device type of "web" may correspond to a configuration where the reading application on the reading device is a web application such as an application that runs in a web browser application on a laptop computer or a desktop computer. However, no particular set of reading device types are required, and the set of possible reading device types can be selected to distinguish between reading devices with or operatively coupled to different screen sizes or other screen or device characteristics that affect the readability of text.

Readability, in the context of text formatting, can refer to the ease with which a line or block of text can be understood and comprehended as influenced by the formatting of the text such as font and spacings. Readability, in a broader context, is also influenced by the complexity of the language of the text and other factors such as the layout of the text of the page. The techniques herein aim to control for language complexity and text layout and identify readability themes from the diverse reading format preferences of users.

Not every reading format selected by a user using the text format settings panel of the reading application may be used by the user for reading displayed text. For example, a user may select a reading format and then immediately change the text format settings after realizing the selected reading format is not suitable. In this case, the selected reading format may not be considered "used." For example, a selected reading format may be considered used only if a minimum amount of time has elapsed (e.g., 10, 30, or 60 seconds) since the user last changed a text format setting on the panel. As another example, a selected reading format may be considered used only if the user thereafter provides input to the reading application to set focus on the text or to bring the text into the foreground on the display screen and the focus or foreground state remains constant for at least a predetermined amount of time (e.g., 10, 30, or 60 seconds) after the user input is received. For example, if at Time 0 the user selects a first reading format, at Time 1 after Time 0 the user provides user input that sets the reading application's focus on text having the first reading format applied to it (e.g., by moving a pointing device cursor to a GUI window displaying the text), then at Time 2 which is less than a threshold amount of time (e.g., 30 seconds) after Time 1 the user returns to the reading application's focus to the text format settings panel, then the first reading format may not be considered used. However, if at Time 3 after Time 2 the user selects a second reading format and at Time 4 after Time 3 the user provides user input that sets the reading application's focus on the text having the second reading format and the focus remains constant for at least the threshold amount of time, then the second reading format may be considered used by the user.

A user may use multiple reading formats over time. Each reading format used by the user may be recorded. The text format settings recorded in a used reading format may include all text format settings that are available for configuration on the text format settings panel or a subset thereof. In some embodiments, the text format settings panel includes graphical user interface controls for configuring all of the following text format settings: font, font size, line height, character spacing, word spacing, paragraph ident, paragraph spacing, text alignment, column width, dark mode, color theme, and contrast. In some embodiments, the text format settings that are recorded for a used reading format include just font, line spacing, word spacing, and character spacing. Thus, readability themes generated from used reading formats can encompass all or just a subset of all individual text format settings that are available for user configuration on a text format settings panel.

Users in cohort 120 may having diverse reading abilities and consequently use diverse reading formats. For example, cohort 120 may encompass tens, hundreds, thousands, or more users. Some but not all users in the cohort 120 may have dyslexia, either formally diagnosed, self-labeled, or that score highly on a dyslexia questionnaire. Users in the cohort 120 (both dyslexic and non-dyslexic) may span different age brackets such as 18-25, 26-35, 36-45, 46-55, and 56-87+. The users in the cohort 120 may be representative of a population such as a population of children learning to read, a population of young professionals, old age readers, or some mix of the foregoing. The cohort 120 can include users from different populations. For example, cohort 120 can include a population of children learning to read, a population of young professionals, and a population of old readers where some users in each population are dyslexic. However, no particular cohort 120 is required and the users in cohort 120 may be selected according to the requirements of the particular implementation at hand including the ages and reading abilities or other characteristics of the users that the generated readability themes are to be representative of.

Users in cohort 120 use different reading formats to read text at their reading devices and the reading formats are recorded at the reading devices. The reading devices at Step 1 send the recorded reading formats to readability theme generation system 100 for storage there as reading formats 102. System 100 can continually receive reading formats 102 from reading devices of users in cohort 120 over a period of time. The period of time can be predetermined, or the period of time can end when a sufficient number of reading formats 102 are received. The predetermined period of time can be days, weeks, or months, for example, or other suitable period of time during which a sufficient number of reading formats 102 are received. The sufficient number may be a predetermined number such as, for example, one hundred, two hundred, one thousand, or two thousand reading formats, other suitable number. In some embodiments, a sufficient number is received when at least a threshold number of reading formats are received and there is sufficient diversity in the reading formats received. The diversity of the reading formats received can be measured by an algorithm that computes a statistical dispersion metric based on the text format settings of the reading formats received. For example, the statistical dispersion metric may be based on any or all of: standard deviation, interquartile range, range, mean absolute different, median absolute deviation, average absolute deviation, or distance standard deviation of the sets of text format settings of the reading formats received. It may be determined that there is sufficient diversity in the reading formats received if the statistical dispersion metric computed for the received reading formats exceeds a threshold indicating sufficient diversity in the text format settings of the reading formats received.

In addition to or as an alternative to diversity of text format settings, diversity of users can be measured. For example, a sufficient number of reading formats may be considered to be received when the number of received reading formats 102 exceeds a threshold number, there is a sufficient diversity in the text format settings of the received reading formats 102, and there is at least a threshold number or threshold percentage of reading formats received in each of a set of user categories. The set of user categories can be different age ranges or different reading abilities.

In addition to or as an alternative, diversity of reading device types can be measured. For example, a sufficient number of reading formats may be considered to be received when the number of received reading formats 102 exceeds a threshold number and there is at least a threshold number or threshold percentage of reading formats received from each type of reading device in a set of reading device types (e.g., mobile and web). Overall, the system 100 may continue to receive reading formats from the reading devices of users in cohort 120 until a condition is satisfied where that condition can be based on any or all of: an amount of time, the number of reading formats received, the diversity of text format settings in the reading formats received, the diversity of ages or reading abilities of the users that used the reading formats received, and types of reading devices used by users that used the reading formats received.

Once a sufficient number of reading formats 102 are received, then, at Step 2, reading format images 104 are generated based on reading formats 102. Reading format images 104 are used subsequently at Step 3 to train a convolutional neural network model to encode images 104 as perceptual embeddings 106. A reading format in reading formats 102 may be used to generate one or more reading format images of reading format images 104. Thus, multiple reading format images may be generated from a single reading format.

To generate a set of one or more reading format images 104 from a reading format in reading formats 102, a screenshot (digital image) of the reading format is generated in and captured from a virtual frame buffer. The virtual frame buffer (equivalently a virtual display) encompasses software that simulates a video frame buffer that is used to store digital images in memory (e.g., 116). The virtual frame buffer allows system 100 to create one or more text screenshots of each reading format. The virtual frame buffer can be implemented as software (e.g., the X virtual framebuffer) that creates a virtual display device and display text in a reading format on the virtual display as it were being displayed on a physical video display device.

Figure 7:
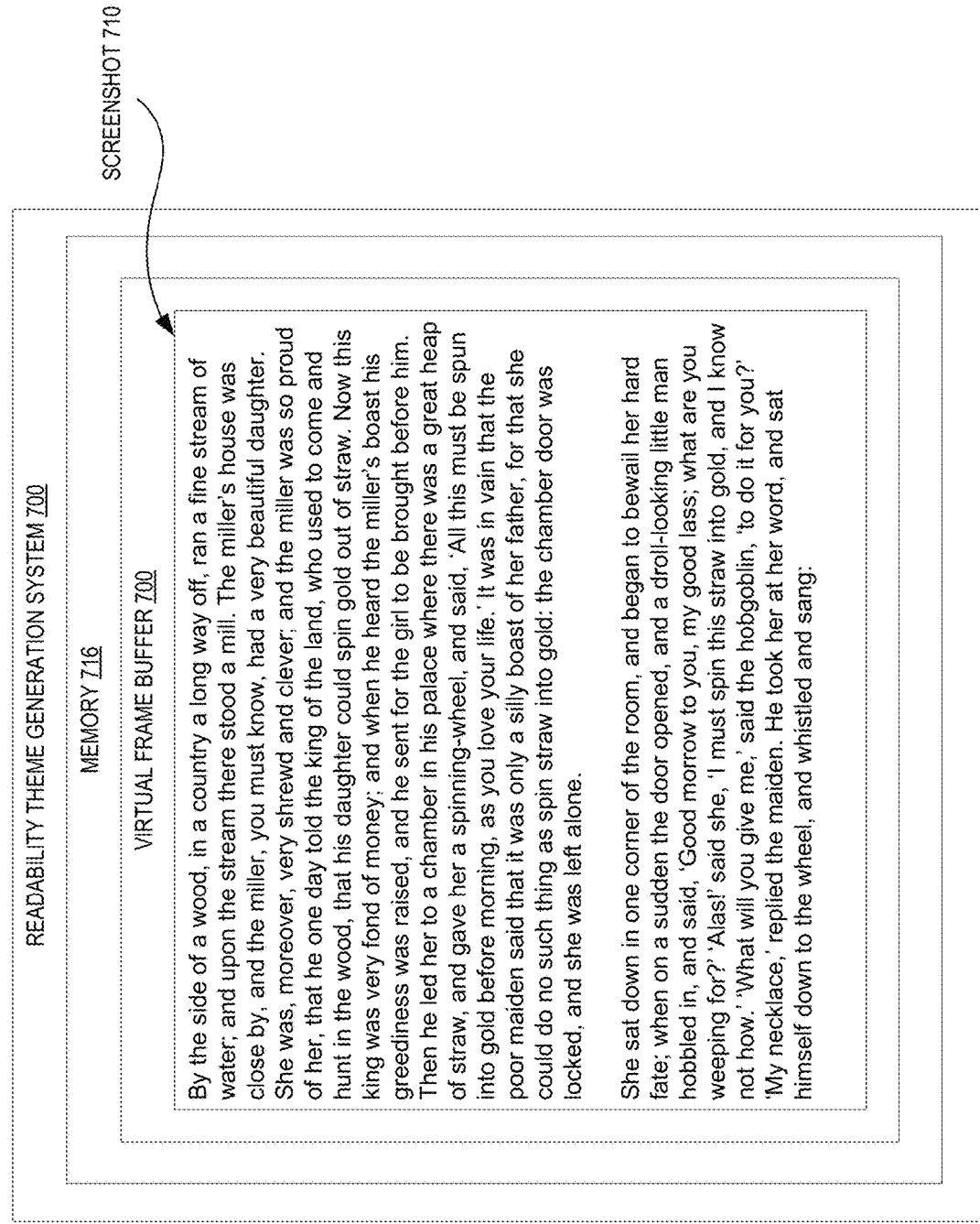
FIG. 7 depicts a text screenshot in a virtual frame buffer stored in a memory of a readability theme generation computer system, according to an embodiment.

A text screenshot captured using the virtual frame buffer encompasses a digital image of text formatted in accordance with a reading format of reading formats 102. For example, if the reading format encompasses a font, a line spacing, a character spacing, and a word spacing, then the screenshot may encompass a digital image of text in that front and with that line, character and word spacing. For example, FIG. 7 depicts a text screenshot 710 in a virtual frame buffer 700 stored in memory 716 of readability theme generation system 700. The text of the screenshot 710 is formatted in the particular font and with the line, character, and word spacing of a reading format.

In some embodiments, the text used in generated screenshots is from the same or similar text source across all screenshots generated for reading formats 102. In other words, the text content may be normalized across the generated screenshots. This way, bias resulting from different text content is reduced or eliminated in the perceptual embeddings generated based on the text screenshots. For example, the text screenshots can be generated from the same document. The document may encompass one or more pages or sections of text. The text may comprise data that includes sequences of characters such as letters, numbers, or symbols. The text data may comprise a series of bits or bytes, with each character represented by a specific pattern of bits or bytes according to a character encoding (e.g., ASCII, UNICODE, or UTF-8).

While in some embodiments text screenshots are generated from the same document, text screenshots are generated from different documents with different text in other embodiments. For example, the text screenshots generated for a reading format can be generated from the document to which or for which the user applied or selected the reading format.

To generate the text screenshots from a document containing text, system 100 executes a reading application to display text formatted according to the reading formats 102 into one or more virtual frame buffers. The text screenshots are captured from the virtual frame buffer(s). Each screenshot may be of a page or other section or portion of the document with text formatted according to a reading format of the reading formats 102. One or more screenshots may be captured for each reading format. For example, a text screenshot may be captured for each page, section, or portion of the document for each reading format.

The text in a screenshot can be formatted by the reading application outputting display of the screenshot to the virtual frame buffer according to one or more text format settings of reading format. For example, the text in a screenshot can be formatted according to a font, a line spacing, a character spacing, and a word spacing of a reading format. Additionally, the text in a screen shot can be formatted by the reading application outputting display of the screenshot to the virtual frame buffer according to one or more normalized text format settings. A normalized text format setting is a text format setting that is the same or that is normalized across all screenshots captured for all reading formats 102. For example, normalized text format settings can include any or all of: font size, paragraph ident, paragraph spacing, column width, text alignment, color theme, contrast, and dark mode.

The variability in viewing distance, screen size, and screen resolution of users and the reading devices used by users in cohort 120 may be confounded with the optimal font size. Users may attribute variations in font size settings to reading device and reading environment-specific idiosyncrasies. Accordingly, in one embodiment, the font size may be fixed (e.g., at 12 px, 14 px, or 16 px) for all screenshots captured for all reading formats 102.

Even at the same font size, fonts with taller x-heights may affect the preferences of users in terms of readability with respect to fonts with lower x-heights. The term "x-height" is a used to refer to the distance between the baseline of a font and the top of the lowercase letters of the font that do not have ascenders or descenders. For example, the lower-case letter 'x' is typically one of the lowercase letters in a font that does not have an ascender or descender. Hence, the name "x-height." The term x-height can also refer to the average height of lowercase letters of a font. Some fonts can be ten to twenty percent or more taller in x-height than other fonts. Taller fonts can result in perceptually tighter spacing between lines of text at the same font size and despite the same spacing settings. The x-height of a font is distinct from the glyph height of the font. The term "glyph height" refers to the total height of a character or symbol in a font, including any ascenders or descenders. The glyph height of a font is typically measured from the top of the highest ascender to the bottom of the lowest descender.

Figure 8:
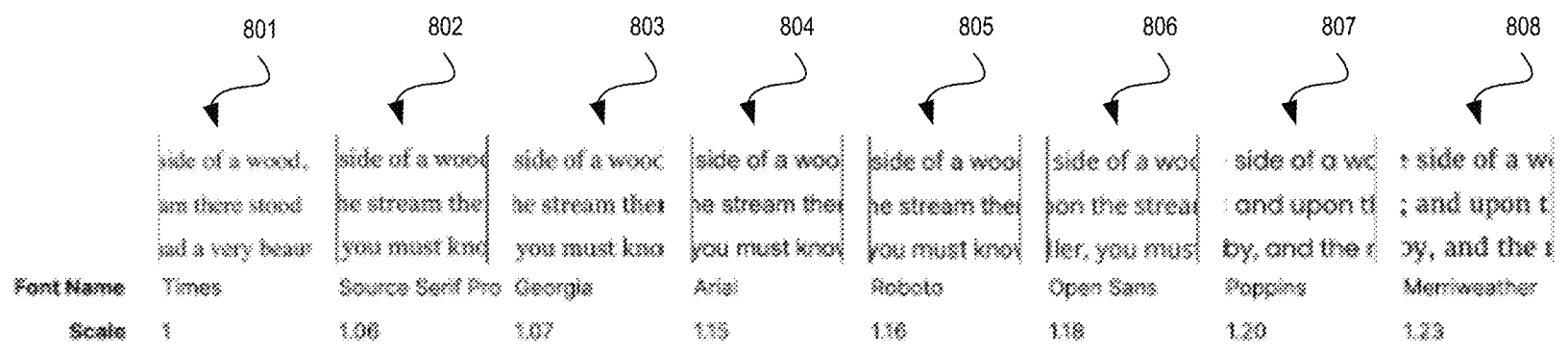

Turning briefly to FIG. 8, it illustrates how fonts vary in perceptual size even when displayed at the same font size and spacing settings. From fonts 801 to 808, fonts increase in x-height and decrease in line spacing. The tallest font 808 is 23% taller in x-height than the shortest font 801. In some embodiments, to mitigate bias introduced by unequal x-heights of fonts and to ensure text format settings independently affect reading format, different fonts of text in captured screenshots are normalized to have equal x-heights. For example, all text of all screenshots captured for all reading formats 102 can have the same font size (e.g., 16 px) and the same x-height so that the text appears perceptually similar in the screenshots and to reduce or eliminate confounds of the variability in viewing distance, screen size, and screen resolution among users and users' reading devices with optimal font size. Other text format settings that may be normalized across all screenshots include any or all of: paragraph indent, paragraph spacing, text alignment, column width, dark mode, color theme, and contrast. Normalizing a target font for x-height can include calculating the x-height of a reference font (e.g., Times) at a reference font size (e.g., 16 px). Then, the target font is resized such the x-height of the target font at the reference font size is equal to the x-height of the reference font at the reference font size. As indicated, the x-height of a font can be measured as the average height of all lowercase characters that do not include ascenders and descenders (e.g., excluding the characters 'b', 'd', 'f', 'h', 'i', 'j', 'k', 'l', 't', 'g', 'j', 'p', 'q', and 'y').

Returning to FIG. 1, reading format images 104 are generated by extracting image crops (crops) from the captured screenshots. Each crop can be a predetermined size (e.g., 128 pixels per side). The predetermined size can be selected to capture multiple lines of text at varied spacings. The predetermined size can also be selected to correspond to a predetermined degree of visual angle (e.g., 3.36 degrees of visual angle) that a user typically has when viewing text displayed on a screen at a typical viewing distance from the screen.

Figure 9:
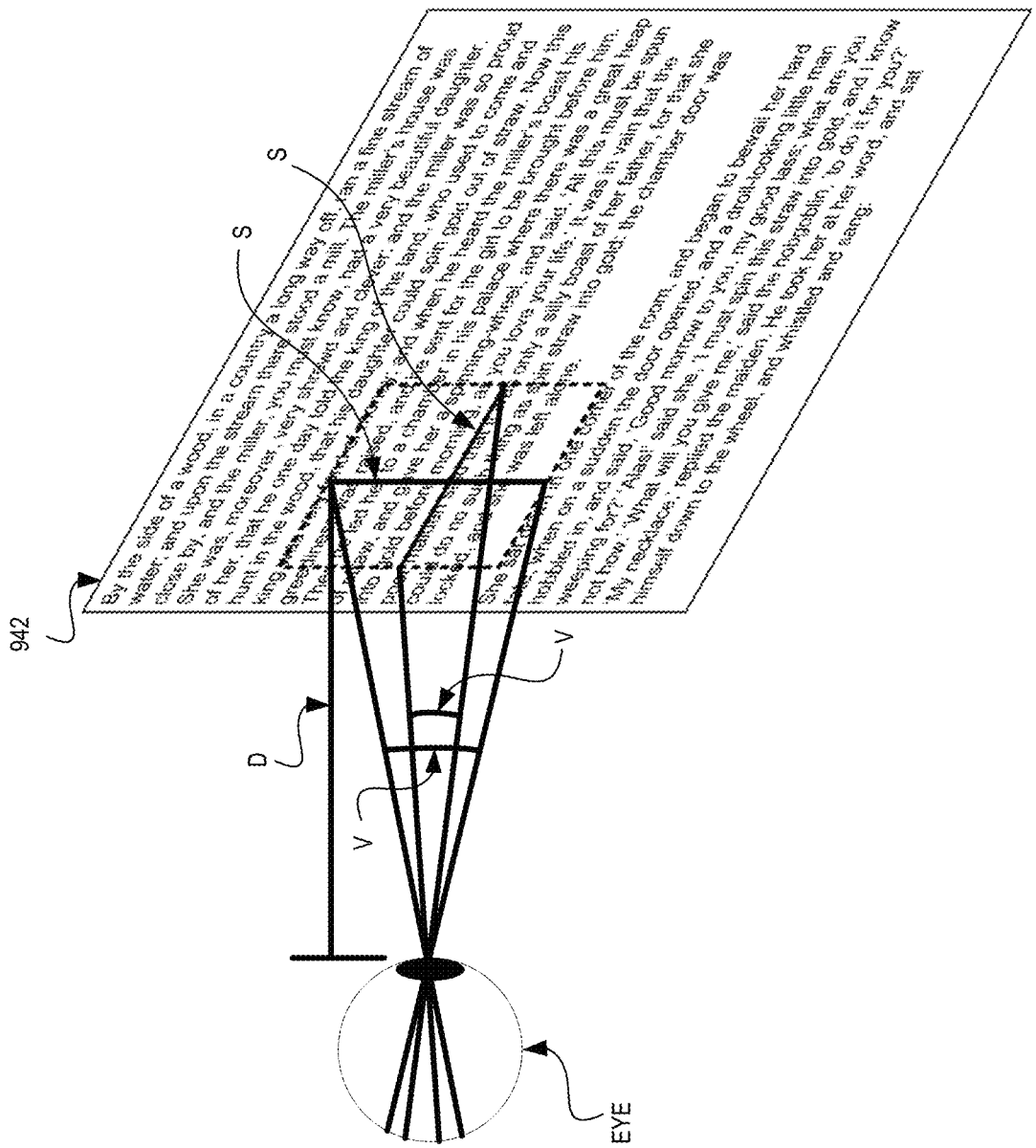
FIG. 9 illustrates the concept of visual angle, according to an embodiment.

FIG. 9 illustrates the concept of visual angle, according to an embodiment. A user's eye is D distance from the display screen 942 on which text the user is reading is displayed. The user's eye has an effective linear vertical and horizontal distance S when looking at the screen and reading the text. Distance D may represent the typical viewing distance. Linear distance S may represent the typical effective linear distance of the human eye when reading text on screen 942 at typical viewing distance D. The visual angle V can be calculated as a function of distances D and S. For example, the visual angle V can be calculated as $\tan(V)=S/D$.

In some embodiments, the size of each crop extracted from a screenshot is determined based on a given visual angle V and a given viewing distance D. For example, in some embodiments, size of each crop is 128 pixels by 128 pixels corresponding to 3.36 degrees of visual angle at a particular viewing distance D. While each crop can have same dimensions in both the vertical and horizontal direction, each crop can have different length and height dimensions. For example, the height of each crop in the vertical dimension can be determined based on a given vertical visual angle V' and the given viewing distance D and the length of each crop in the horizontal dimension can be determined based on a given horizontal angle V" and the given viewing distance.

A predetermined number of crops can be extracted from the screenshots captured for each reading format. For example, tens, hundreds, or a thousand crops can be extracted from one or more screenshots captured for a reading format. The predetermined number can be selected such that there is a sufficient number of crops for training the machine learning model to learn to encode the crops as perceptual embeddings. Each crop can be extracted from a random location in a screenshot. FIG. 10 illustrates an example of random locations of crops (depicted as boxes) extracted from a screenshot 1000, according to an embodiment. As shown, crops can overlap each other. Some crops near an edge of the screenshot may be smaller than the predetermined size in width and/or height if the crop at the predetermined size would extend beyond an edge of the screenshot.

Figure 11:
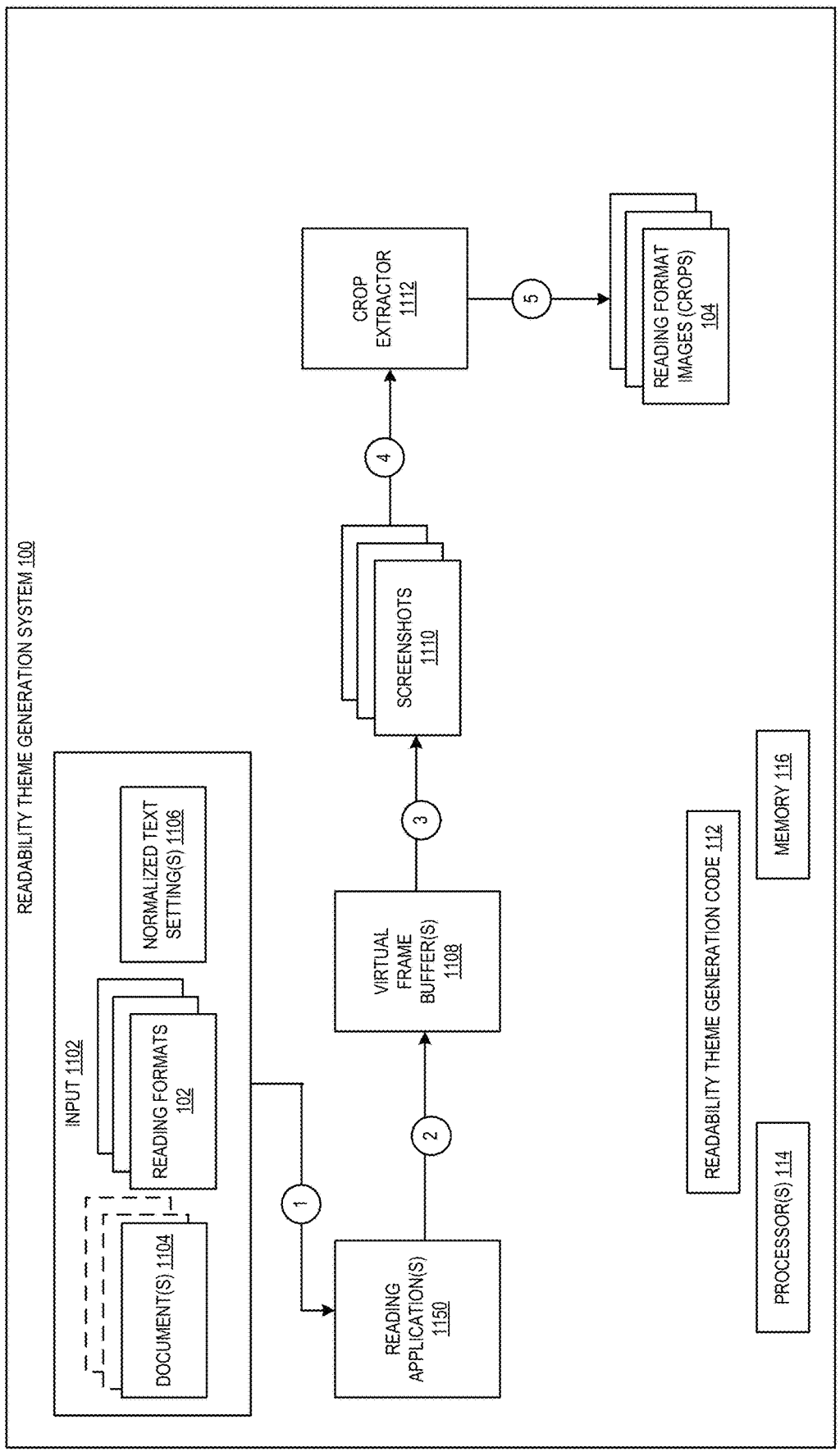
FIG. 11 is a schematic diagram of a system and method for generating reading format digital images from reading formats, according to an embodiment.

FIG. 11 is a schematic diagram of a system and method for generating reading format images 104 from reading formats 102, according to an embodiment. As shown, readability theme generation system 100 may include, but is not limited to, input 1102, reading application(s) 150, virtual frame buffer(s) 1108, screenshots 1110, crop extractor 1112, and reading format images 104. Input 1102 include document 1104, reading formats 102, and normalized text format setting(s) 1106.

As shown, the system 100 includes one or more reading applications 1150 that can execute in a "headless" configuration. By headless, the reading application(s) 1150 can execute and perform their functions on a computer (e.g., system 100) without the reading application(s) 1150 or the computer being connected to an electronic output device such as a video monitor or display and without the application application(s) 1150 or the computer being connected to physical user input devices such as a physical keyboard, touch screen, or pointing device. Although, the reading application(s) 1150 or the computer may be connected to virtual frame buffer(s) 1108. Instead, reading application(s) 1150 may be interacted with using an application programming interface (API) that allows another process or program (e.g., running on system 100) to command the reading application(s) 1150 to, for example, output display of a page, section, or portion of a document to a virtual frame buffer and format the text of document page, section, or portion in accordance with a set of one or more text format settings specified via the API. Multiple reading applications 1150 and multiple virtual frame buffers 1108 may be used to generate screenshots 1110 from input 1102 in a parallel processing manner. For example, if there are N pairs of a reading application and a corresponding virtual frame buffer and there are M reading formats 102, then each reading application and corresponding virtual frame buffer pair can generate screenshots for approximately M/N reading formats in parallel with the other reading application-virtual frame buffer pairs.

A reading application can be any application capable of rendering or outputting text according to one or more text format settings to realize a particular text or reading format. The reading format is the way the text is displayed on a video screen or in a virtual frame buffer. The text format settings can include any or all of: character spacing, word spacing, line spacing, font (font name), font size, paragraph indent, paragraph spacing, column width, text alignment, color theme, contrast, and dark mode.

FIG. 11 also depicts a method for generating reading format images 104 from reading formats 102, according to an embodiment. Steps of the method are depicted in FIG. 11 by numbered circles that overlay directed arrows. The directed arrows represent a direction of data flow between connected components but not necessarily the exclusive direction. The method may be performed by system 100 as a result of processor(s) 114 executing code 112 stored in memory 116.

At Step 1, an input 1102 is provided to reading application(s) 1150. The input 1102 includes document 1104, reading formats 102, and normalized text format setting(s) 1106. Document 1104 encompasses one or more pages, sections, or portions of text. Reading formats 102 are received from the reading devices used by cohort 120 as in Step 1 of the method of FIG. 1. The method generates a set of one or more screenshots for each reading format of reading formats 102. And from each screenshot generated for a reading format, the method generates one or more reading format images (digital image crops). In this way, the set of reading format images (crops) 104 are generated from the set of reading formats 102. While in some embodiments screenshots 1110 are generated based on the same input document 1104, screenshots 1110 can be generated based on multiple input documents 1104. For example, the screenshot(s) generated for a particular reading format can be generated based on text of the particular document for which the user in cohort 120 selected the particular reading format.

Normalized text format setting(s) 1106 are the same or normalized across all generated reading format images 104 and all reading formats 102. For example, normalized text format setting(s) 1106 can include any or all of: paragraph indent, paragraph spacing, text alignment, column width, dark mode, color theme, and contrast. Each reading format of reading formats 102 provides a set of text format settings that are unique to that reading format. For example, each reading format of reading formats 102 can provide a unique combination of font, line spacing, character spacing, and word spacing among reading formats 102.

Reading application(s) 1150 format text of document 1104 in accordance with reading formats 102 and normalized text format setting(s) 1106. At Step 2, reading application(s) 1150 can output for display in virtual frame buffer(s) 1108 a page, section, or portion of text of document 1104 formatted in accordance with the text format settings of a particular reading format of reading formats 102 and in accordance with normalized text format setting(s) 1106. The formatted text is output for display in virtual frame buffer(s) 1108.

At Step 3 of the method, screenshots 1110 of the pages, sections, or portions of formatted text of document 1104 output to virtual frame buffer(s) 1108 are captured. Each screenshot is a digital image of page, section, or portion of formatted text of document 1104. A screenshot of the output page, section, or portion can be captured from virtual frame buffer(s) 1108 as a digital image. This can be performed for each page, section, or portion of text of document 1104 for each reading format of reading formats 102 resulting in a screenshot captured for each page, section, or portion of text of document 1104 for each reading format of reading formats 102 with text formatted in accordance with the text format settings of a respective reading format and in accordance with normalized text format setting(s) 1106.

At Step 4, crop extractor 1112 extracts one or more crops from each screenshot of screenshots 1110. Each crop can be extracted from a random location (randomly selected X, Y coordinates) of a screenshot. Each extracted crop is a predetermined size (e.g., 128 pixels by 128 pixels) as described in greater detail elsewhere herein. Crop extractor 1112 extracts enough crops from screenshots 1110 to train a convolutional neural network-based machine learning model to learn to encode reading format images 104 as perceptual embeddings 106. In some embodiments, hundreds or thousands of crops are extracted from screenshots 1110 for each reading format of reading formats 102. However, no particular number of crops are required to be extracted for each reading format.

At Step 5, the extracted crops are stored as reading format images 104. Each reading format image can be associated with an identifier (label) of the reading format that the text of the reading format image is formatted in accordance with. This identifier is referred to hereinafter as the reading format source identifier.

Figure 12:
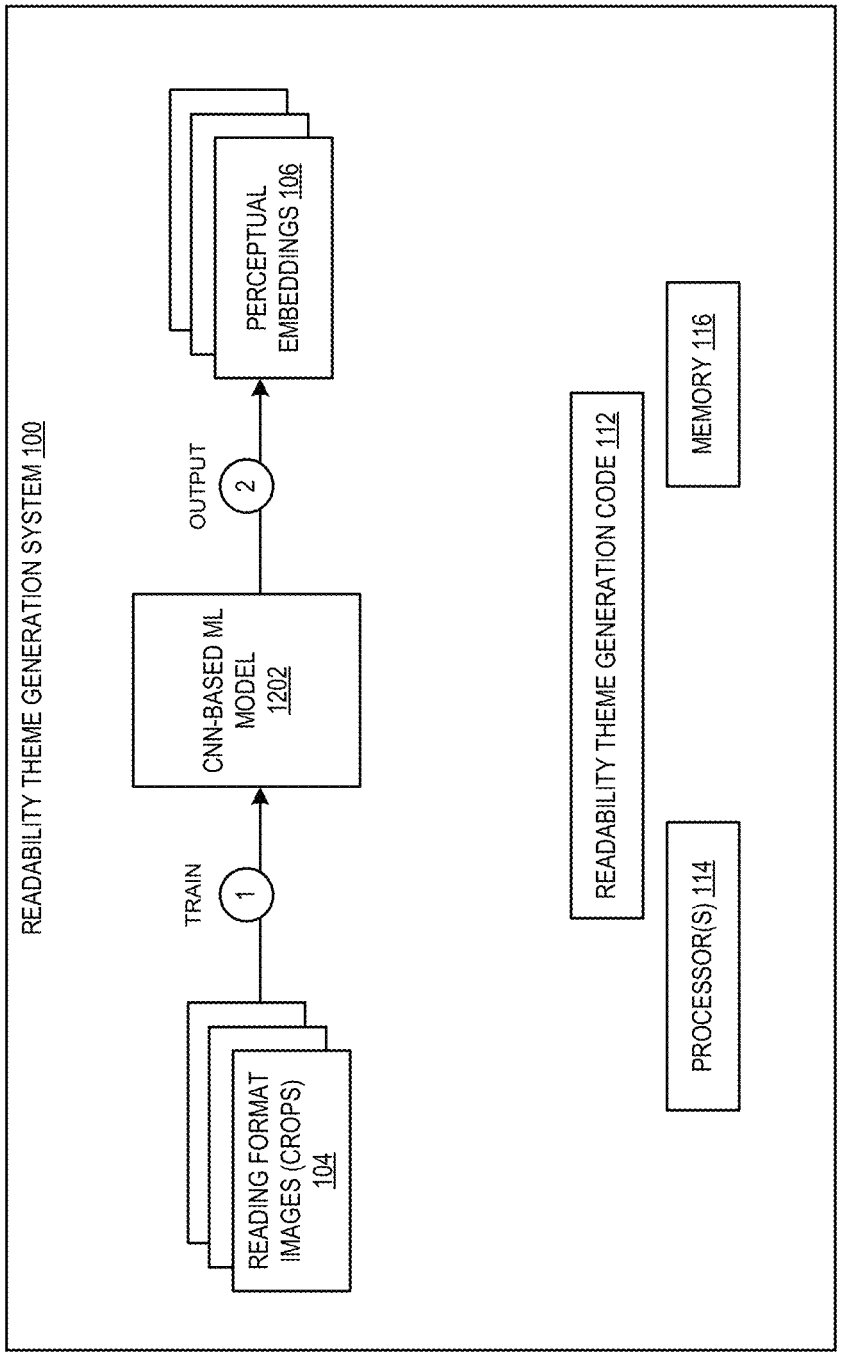
FIG. 12 is a schematic diagram of a system and method for generating perceptual embeddings from reading format images using a convolutional neural network-based machine learning model, according to an embodiment.

FIG. 12 depicts a system and method for encoding reading format images (crops) 104 as perceptual embeddings using convolutional neural network (CNN)-based machine learning (ML) model 1202, according to an embodiment. Generally, model 1202 is trained based on reading format images 104 to generate/output perceptual embeddings 106. Then, reading format images 104 are input to trained model 1202 and perceptual embeddings 106 are produced by model 1202 as output.

Model 1202 is CNN-based. A CNN-based model is particularly well-suited for machine learning from the grid-like topology of digital images. In some embodiments, model 1202 is trained in a supervised or semi-supervised manner. In particular, in the supervised approach, each reading format image of reading format images 104 is labeled with an identifier of the reading format of reading formats 102 that the text depicted in the reading format image is formatted in accordance with. In the semi-supervised approach, only some of the reading format images 104 are labeled and the rest are unlabeled.

Figure 13:
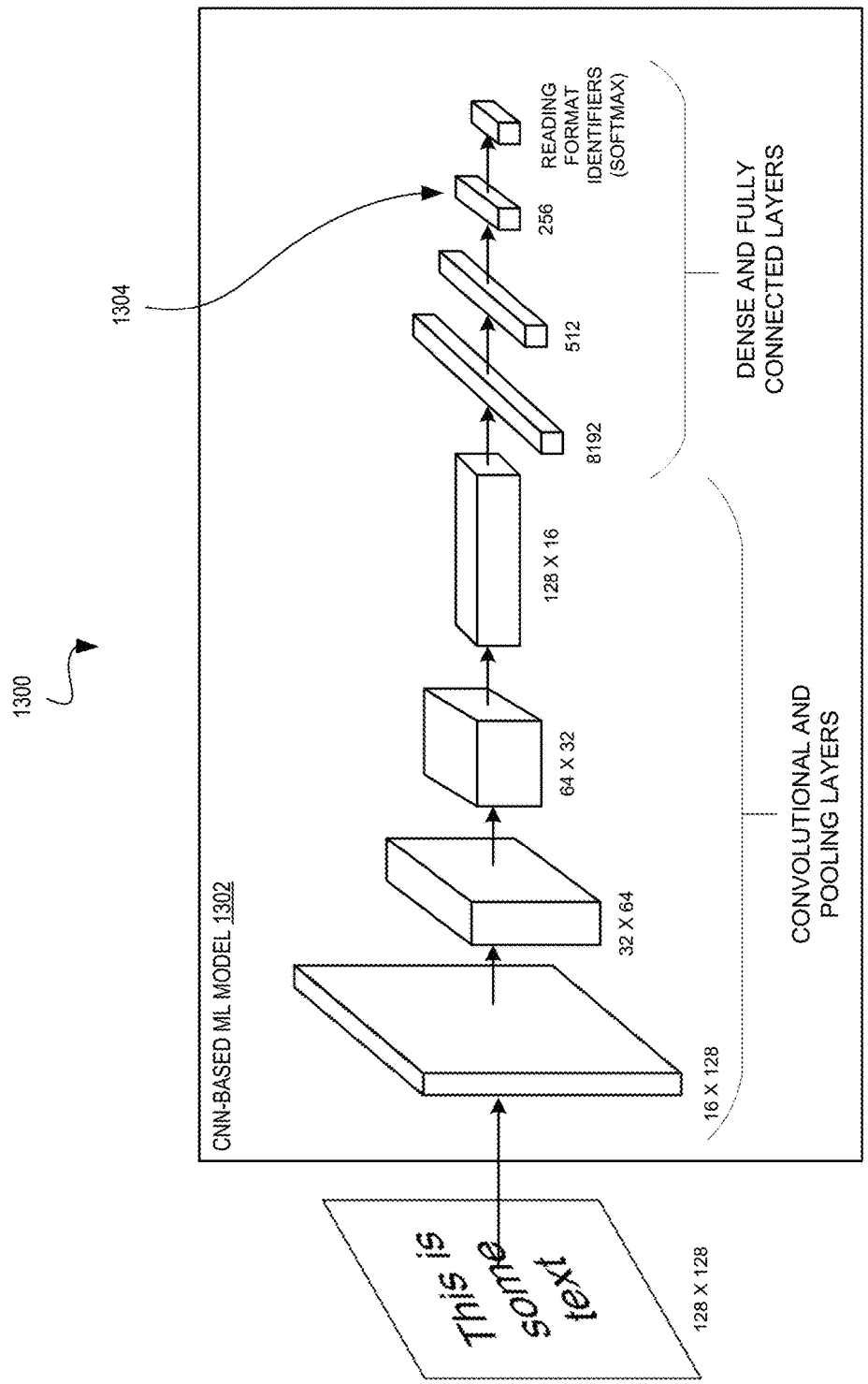
FIG. 13 is schematic of a possible architecture of a convolutional neural network-based machine learning model for generating perceptual embeddings from reading format images, according to an embodiment.

In both the supervised learning and semi-supervised learning case, model 1202 is trained as a classifier to classify reading format images 104 as to reading format source identifier. FIG. 13 illustrates an example architecture 1300 of CNN-based ML model 1302 for supervised learning or semi-supervised learning of perceptual embeddings 106 based on reading format images 104. In the supervised learning case, all reading format images 104 are labeled with their corresponding reading format source identifiers. In this case, model 1302 is trained over the reading format images 104 to minimize a loss function (e.g., cross-entropy loss) according to an optimization algorithm (e.g., stochastic gradient descent, batched stochastic gradient descent, etc.) The model 1302 is trained to predict the reading format source identifier labels assigned to the reading format images 104. In the semi-supervised learning case, model 1302 is trained over the labeled reading format images to minimize the loss function according to the optimization algorithm. Then, the partially trained model 1302 is used to classify the unlabeled reading format images with pseudo-labels that may not be completely accurate. The labels used to label the labeled reading format images are linked with the pseudo-labels and the labeled reading format images are linked with the unlabeled reading format images so that each unlabeled reading format image is assigned one label used to label the labeled reading format images. The partially trained model 1302 is then fully trained based on the now completely labeled set of reading format images 104. Alternatively, model 1302 can be trained from scratch (e.g., a randomized set of model parameters) based on the completely labeled set of reading format images 104.

As shown, model 1302 includes convolutional and pooling layers and dense and fully connected layers. Once model 1302 is trained, either in the supervised or the semi-supervised manner, the reading format images 104 are input to model 1302 again to classify each reading format image. For each classification of a reading format image, the values of the penultimate layer 1304 of model 1302 can be used in the perceptual embedding generated for the reading format image. For example, the values of the penultimate layer 1304 may form a vector of the values where the number of values in the vector (e.g., 256) is the dimension of the vector. This vector is also referred to as an embedding or a perceptual embedding. In this way, a perceptual embedding can be generated for each reading format image and perceptual embeddings 106 can be generated for reading format images 104. The perceptual embeddings 106 have the property that perceptual embeddings closer in distance to each other in an embedding space represent more perceptually similar reading format images and hence more perceptually similar reading formats and perceptual embeddings father apart in distance from each other in the embedding space represent more perceptually dissimilar reading format images and hence more perceptually dissimilar reading formats. The distance between two perceptual embeddings can be computed according to a similarity or distance metric such as cosine distance or the like.

While model 1202 can be a CNN-based machine learning classification model such as model 1302 depicted in FIG. 13 that is trained in a supervised or semi-supervised manner, model 1202 can also be a CNN-based autoencoder that is trained in an unsupervised manner. In this embodiment, model 1202 is composed of an encoder and a decoder. The encoder maps the input reading format images 104 to a lower-dimensional latent space, or encodings, and the decoder maps the encodings back to reconstructions of the original reading format images. The autoencoder can be trained to learn a function that can reconstruct the reading format images from the latent-space encodings. The training can include minimizing a reconstruction loss between the input reading format images 104 and the reconstructed reading format images. The encoder and decoder can be trained jointly over the reading format images 104 by minimizing a reconstruction loss using an optimization algorithm such as stochastic gradient descent or batched stochastic gradient descent. Once the autoencoder is trained, the input reading format images 104 can be input to the trained encoder of the autoencoder and the output latent space encodings can be used as perceptual embeddings 106. Where model 1202 is a CNN-based autoencoder, both the encoder and the decoder of model 1202 can be implemented as CNNs.

Whether trained in a supervised, semi-supervised, or unsupervised manner, model 1202, once trained, is able to generate perceptual embeddings 106 for reading format images (crops) 104 extracted from screenshots 1110 generated from reading formats 102. Each perceptual embedding is generated for one corresponding reading format image. That is, each perceptual embedding encodes one corresponding reading format image. Each reading format image corresponds to one reading format of reading formats 102. Thus, each perceptual embedding of perceptual embeddings 106 corresponds to one reading format of reading formats 102.

Figure 14:
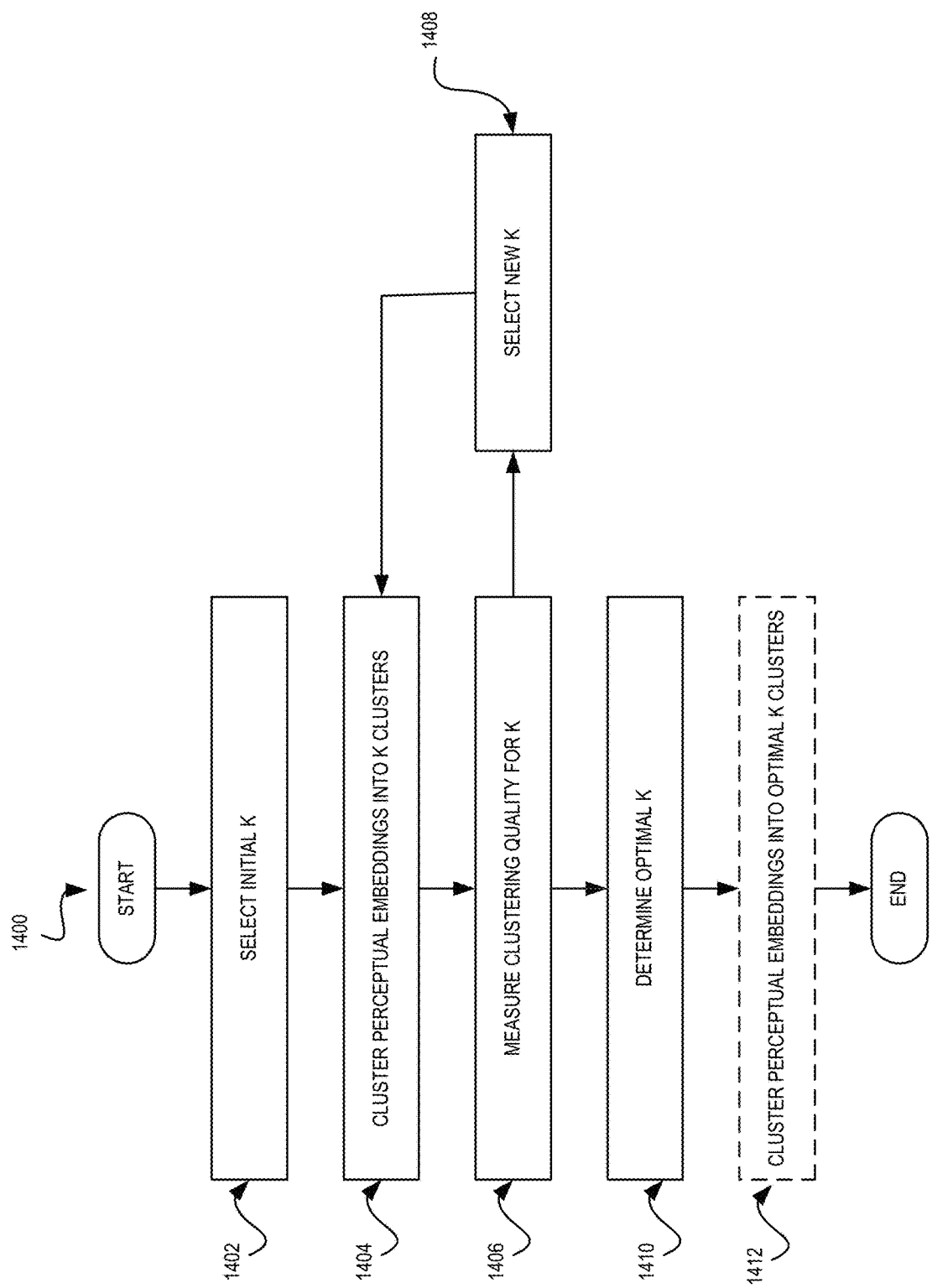
FIG. 14 is a flowchart of a method for determining an optimal number of clusters for clustering perceptual embeddings, according to an embodiment.

FIG. 14 illustrates a flowchart 1400 of a series of acts in a method of clustering perceptual embeddings 106 into reading format clusters 108, in accordance with one or more embodiments. In one or more embodiments, the method 1400 is performed in a digital medium environment that includes the readability theme generation system 100. The method 1400 is intended to be illustrative of one or more methods in accordance with the present disclosure and is not intended to limit potential embodiments. Alternative embodiments can include additional, fewer, or different steps than those articulated in FIG. 14.

In some embodiments, perceptual embeddings 106 are clustered according to a K-means clustering algorithm. With K-means clustering, perceptual embeddings 106 are clustered into a predetermined number K of clusters. K-means clustering is iterative. Perceptual embeddings 106 are partitioned into K clusters based on the mean distance between perceptual embeddings and the centroid (mean) of each cluster. The distance between a pair of perceptual embeddings can be measured according to a similarity metric such as the cosine distance. Initially, K perceptual embeddings are selected from perceptual embeddings 106 to serve as the initial centroid for the K clusters. The remaining perceptual embeddings are assigned to the cluster with the centroid nearest to it. The centroids of the K clusters are iteratively recalculated, and perceptual embeddings potentially reassigned to different clusters until convergence.

The method 1400 can be performed to determine an optimal K. In some embodiments, K is bounded within a range selected based on a reasonable number of readability themes to present as selectable options to users. For example, K may range between 3 and 20. Providing at least three readability themes as options provide users with some minimum diversity in readability theme options. While users may be overwhelmed being provided with more than 20 readability theme options.

At step 1402, an initial K is selected. The initial K may be selected randomly within or a range (e.g., between 3 and 20 inclusive). Alternatively, the initial K may be selected according to a heuristic such as a typical number of clusters that are formed.

At step 1404, perceptual embeddings 106 are clustered into current K clusters according to the K-means algorithm until convergence. A similarity metric can be used in the K-means algorithm to determine how similar two perceptual embeddings are. For example, the similarity metric can be a cosine similarity.

At step 1406, the current K clusters are evaluated to measure the quality of the clustering with the current K. One measure that can be used is a silhouette score. A silhouette score is a measure of how well-defined a cluster is in perceptual embeddings. For example, a silhouette score can be a value between −1 and 1. A higher silhouette score (closer to 1) indicates that the perceptual embeddings within a cluster are similar to each other and distinct from the perceptual embeddings in other clusters. A lower silhouette score (closer to −1) indicates that the perceptual embeddings within the cluster are less distinct from the perceptual embeddings in other clusters. Computing the silhouette score for a "target" cluster in the current K clusters may include calculating the average distance between a perceptual embedding in the target cluster and other perceptual embeddings in the target cluster (equivalently the "intra-cluster distance") and include calculating the average distance between a perceptual embedding in the target cluster and perceptual embeddings in the nearest neighboring cluster (equivalently the "inter-cluster distance."). The silhouette score for the target cluster can be defined as the difference between the intra-cluster distance for the target cluster and the inter-cluster distance for the target cluster divided by the maximum of those two distances. A silhouette score can be computed in this way for each cluster of the current K clusters. The current K clusters can be evaluated overall by the average of the silhouette scores computed for the clusters. A higher average silhouette score indicates a better clustering of perceptual embeddings 106 than a lower average silhouette score. Additionally or alternatively, other cluster quality measures can be used to measure the clustering quality of current K such as the within-cluster sum of squared distances.

At step 1408, a new K is selected and steps 1404 and 1406 are repeated for the newly selected K. Steps 1404, 1406, and 1408 can be performed for different values of K. For example, steps 1404, 1406, and 1408 can be performed to evaluate each K between 3 and 20 inclusive.

At step 1410, an optimal K is determined based on the quality measures for different Ks determined at steps 1404, 1406, and 1408. One way to determine the optimal K is to use a knee-point heuristics method. Knee-point heuristics is premised on the optimal K being represented by an inflection point or knee in a plot of the quality measure against the ordered values of K for which the quality measure was computed at step 1406. A knee-point heuristics algorithm given a set of ordered values of K for which the quality measure was computed at step 1406 and the corresponding quality measurements (e.g., silhouette score, within-cluster sum of squared distances) can determine the point at which the plot bends or breaks (equivalently the knee or elbow point). The number of clusters corresponding to this point can be selected as the optimal K.

At optional step 1412, perceptual embeddings 106 are clustered into the optimal K number of clusters. Step 1412 may not need to be performed if the optimal K clusters calculated at step 1404 were retained.

Figure 15:
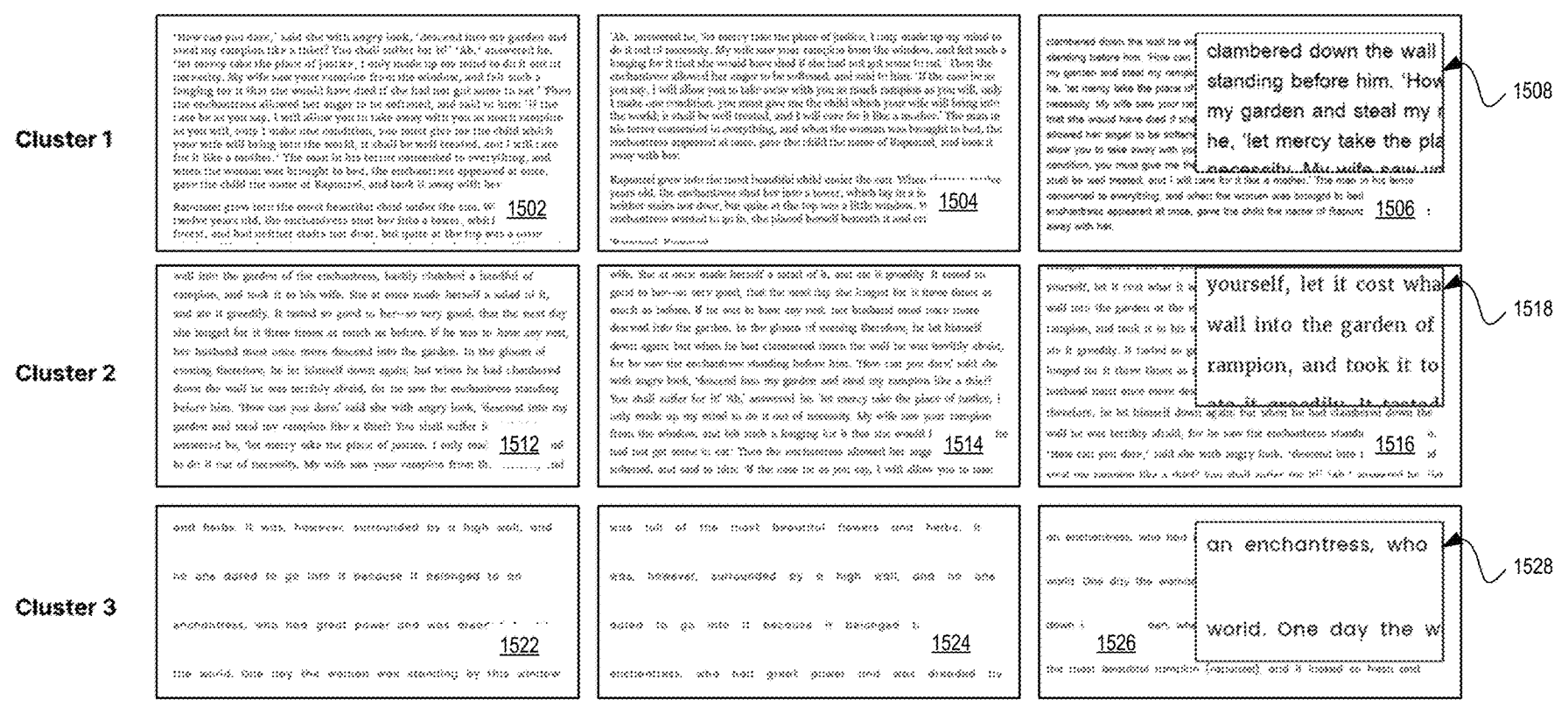

After the optimal K reading format clusters 108 are formed, each cluster contains perceptual embeddings representing perceptually similar reading formats of reading formats 102. FIG. 15 depicts an example of different reading formats clustered into three clusters. In particular, reading formats 1502, 1504, and 1506 are clustered into "Cluster 1," reading formats 1512, 1514, and 1516 are clustered into "Cluster 2," and reading formats 1522, 1524, and 1526 are clustered into "Cluster 3." As shown, reading formats in each cluster exhibit similarities in spacing and font settings. This example also shows that reading formats with similar but not identical fonts, such as Source Serif Pro and Times, can be clustered together if space settings are similar. Example reading format images (crops) 1508, 1518, and 1520 more clearly show the different text spacings among the clusters.

Referring back to FIG. 1, readability themes 110 are determined from reading format clusters 108. In some embodiments, this determination is based on selecting a representative perceptual embedding based on the centroid of each cluster. In particular, the perceptual embedding closest in distance (e.g., according to cosine similarity) to the centroid of the cluster is selected as the representative perceptual embedding for the cluster. A readability theme is then determined for each cluster based on the representative perceptual embedding selected for the cluster. In particular, the readability theme for the cluster is determined as the readability format of reading formats 102 that the selected representative perceptual embedding represents. For example, the font, line spacing, word spacing, and character spacing of the readability format can become the font, line spacing, word spacing, and character spacing of the readability theme.

Figure 16:
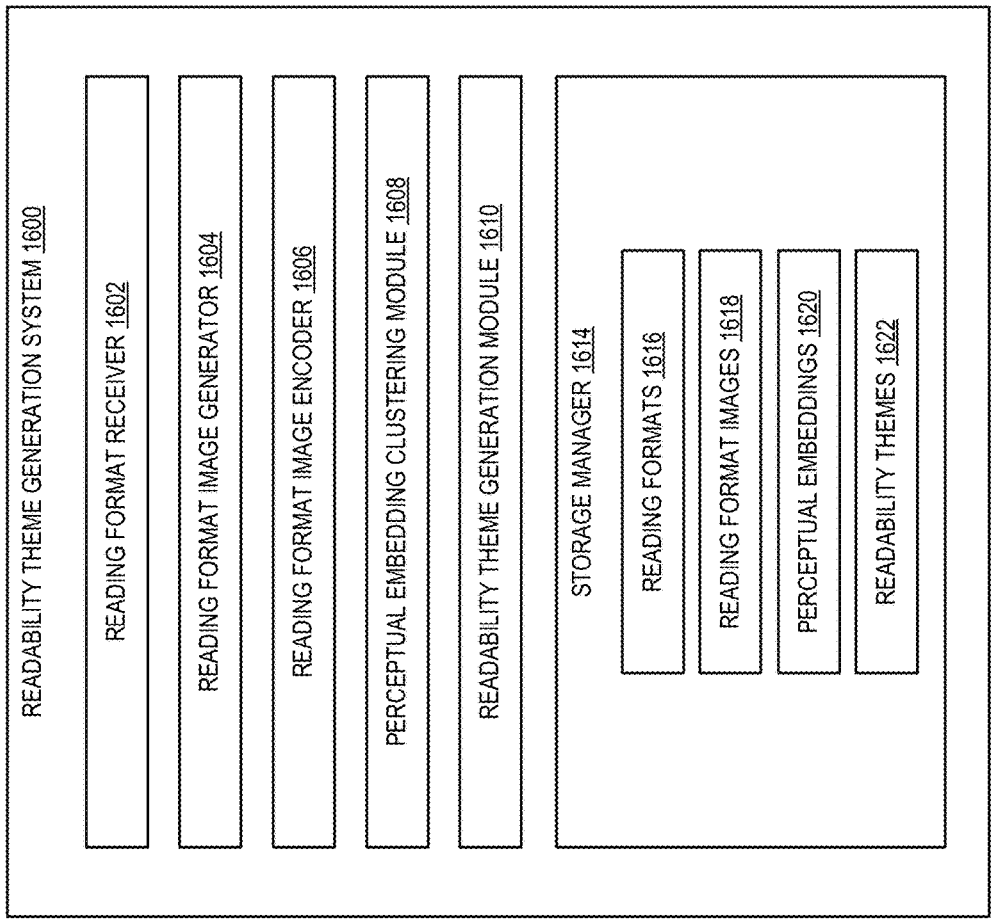
FIG. 16 illustrates a schematic diagram of a readability theme generation system, according to an embodiment.

FIG. 16 illustrates a schematic diagram of readability theme generation system described above in accordance with an embodiment. As shown, generation system 1600 may include, but is not limited to, a reading format receiver 1602, reading format image generator 1604, reading format image encode 1606, perceptual embedding clustering module 1608, readability theme generation module 1610, user interface manager 1612, and storage manager 1614. As described herein with reference to FIG. 11 the reading format image generator 1604 can include reading application(s) 150, virtual frame buffer(s) 1108, and crop extractor 1112. Similarly, as described herein with reference to FIG. 12, the reading format image encoder 1606 can include CNN-based ML-model 1202. In some embodiments, as described with reference to FIG. 14, perceptual embedding clustering model 1608 performs a clustering process 1400.

As illustrated in FIG. 16, the generation system 1600 includes a reading format receiver 1602. Receiver 1602 receives batched data from many previous reading formats used among a cohort of users. For example, tens or hundreds of users of different ages (e.g., children learning to read, adults, and old age persons), different reading abilities (e.g., some with dyslexia and some without), and using different types of reading devices (e.g., mobile devices, laptop computers, and desktop computers) may use reading applications (e.g., document reading applications or web browser applications) at their reading devices to select different sets of individual text format settings (reading formats) according to their diverse text formatting preferences. The batched data can be received from the reading devices of users in the cohort according to any suitable network protocol such as the HyperText Transfer Protocol (HTTP) or the Secure-HyperText Transfer Protocol (HTTPS). Receiver 1602 can receive the batched data over a period of time. The length of the period of time can be predetermined, or the period of time can end when a sufficient amount of batched data has been received, as described herein. Receiver 1602 can request storage manager 1614 to store the received batched data as reading formats 1616. Each stored reading format of reading formats 1616 can encompass one or more text format settings (e.g., a font setting, a line spacing setting, a word spacing setting, and a character spacing setting). Additionally, each stored reading format 1616 may encompass any or all of: an identifier of a document to which a user applied the text format setting(s), an identifier of the user, an identifier of the type of reading device used by the user, or an identifier of the reading format.

The generation system 1600 includes reading format image generator 1604. Generator 1604 generates reading format images 1618 from reading formats 1616. Each reading format image of reading format images 1618 may be a digital image crop of a digital image screenshot captured from a virtual frame buffer. The screenshot may be of a page, section, or portion of a document. The screenshot may include text formatted in accordance with reading format of reading formats 1616. Additionally, the text of the screenshot may be formatted in accordance with the one or more additional text settings that are the same or that are normalized across all screenshots captured for reading formats 1616.

The generation system 1600 includes reading imager format encoder 1606. Encoder 1606 uses a convolutional neural network-based machine learning model to encode the reading format images 1618 as perceptual embeddings 1620. In some embodiments, the CNN-based ML model is architected as depicted in FIG. 13 and is trained in a supervised or semi-supervised manner based on reading format images 1618. In other embodiments, CNN-based ML model uses an autoencoder architecture and is trained in an unsupervised manner based on reading format images 1618. The perceptual embeddings 1620 can be vectors of numbers where each perceptual embedding encodes how the text as formatted in a reading format image is visually perceived. Perceptual embeddings 1620 have the property that perceptual embeddings encoding more perceptually similar text formats are closer in distance (more similar) in an embedding space according to a distance (similarity) metric (e.g., cosine distance) than perceptual embeddings encoding less perceptually similar text formats.

The generation system 1600 includes perceptual embedding clustering module 1608. Clustering module 1608 clusters perceptual embeddings 1620 into K clusters where K is pre-determined according to one or more clustering quality metrics or techniques such a silhouette score or knee-point heuristics. Each cluster contains perceptual embeddings encoding perceptually similar reading formats. In some embodiments, a K-means clustering algorithm is performed by clustering module 1608 to cluster the perceptual embeddings 1620.

The generation system 1600 includes readability theme generation module 1610. Generation module 1610 generates a readability theme based on each of the K clusters produced by clustering module 1608. In some embodiments, the readability theme for a cluster is generated based on the centroid of the cluster. Then, the perceptual embedding in the cluster that is closest in distance to the centroid is selected as representative of the cluster. The text setting(s) of the reading format corresponding to the representative perceptual embeddings are used in the readability theme generated for the cluster.

The generation system 1600 includes storage manager 1614. The storage manager 1614 maintains data for the generation system 1600. The storage manager 1614 can maintain data of any type, size, or kind as necessary to perform the functions of the generation system 1600. Storage manager 1614 can store reading formats 1616 received by reading format receiver 1602, can store reading format images 1618 generated by reading format image generator 1604, can store perceptual embeddings 1620 generated by reading format image encoder 1606, and can store readability themes 1622 generated by readability theme generation module 1610.

Each of the components 1602-1614 of the generation system 1600 and their corresponding elements (as shown in FIG. 16) may be in communication with one another using any suitable communication technologies. It will be recognized that although components 1602-1614 and their corresponding elements are shown to be separate in FIG. 16, any of components 1602-1614 and their corresponding elements may be combined into fewer components, such as into a single facility or module, divided into more components, or configured into different components as may serve a particular embodiment.

The components 1602-1614 and their corresponding elements can comprise software, hardware, or both. For example, the components 1602-1614 and their corresponding elements can comprise one or more instructions stored on a computer-readable storage medium and executable by processors of one or more computing devices. When executed by the one or more processors, the computer-executable instructions of the readability theme generation system 1600 can cause a client device and/or a server device to perform the methods described herein. Alternatively, the components 1602-1614 and their corresponding elements can comprise hardware, such as a special purpose processing device to perform a certain function or group of functions. Additionally, the components 1602-1614 and their corresponding elements can comprise a combination of computer-executable instructions and hardware.

Furthermore, the components 1602-1614 of the readability theme generation system 1600 may, for example, be implemented as one or more stand-alone applications, as one or more modules of an application, as one or more plug-ins, as one or more library functions or functions that may be called by other applications, and/or as a cloud-computing model. Thus, the components 1602-1614 of the readability theme generation system 1600 may be implemented as a stand-alone application, such as a desktop or mobile application. Furthermore, the components 1602-1614 of the readability theme generation system 1600 may be implemented as one or more web-based applications hosted on a remote server. Alternatively, or additionally, the components of the readability theme generation system 1600 may be implemented in a suite of mobile device applications or "apps."

As shown, the readability theme generation system 1600 can be implemented as a single system. In other embodiments, the readability theme generation system 1600 can be implemented in whole, or in part, across multiple systems. For example, one or more functions of the readability theme generation system 1600 can be performed by one or more servers, and one or more functions of the readability theme generation system 1600 can be performed by one or more client devices. The one or more servers and/or one or more client devices may generate, store, receive, and transmit any type of data used by the readability theme generation system 1600, as described herein.

In one implementation, the one or more client devices can include or implement at least a portion of the readability theme generation system 1600. In other implementations, the one or more servers can include or implement at least a portion of the readability theme generation system 1600. For instance, the readability theme generation system 1600 can include an application running on the one or more servers or a portion of the readability theme generation system 1600 can be downloaded from the one or more servers. Additionally or alternatively, the readability theme generation system 1600 can include a web hosting application that allows the client device(s) to interact with content hosted at the one or more server(s).

For example, upon a client device accessing a webpage or other web application hosted at the one or more servers (e.g., of system 1600), in one or more embodiments, the one or more servers can provide access to a reading application. The client device can send a reading format (a combination of individually selected text format settings) selected by a user of the client device via a text format settings panel provided in a GUI presented by the reading application on a display of the client device. A server of the system 1600 can receive the reading format sent by the client device and store the reading format for later batch processing in accordance with methods for readability theme generation described herein. Upon the client device accessing a web page or other web application hosted at the one or more servers, in one or more embodiments, the one or more servers can provide (send) a set of readability themes. Upon receiving the set of readability themes, the client device can present the set of readability themes as user selectable options on the text format settings panel or in other GUI of the reading application that is displayed on the display of the reading device.

The server(s) and/or client device(s) may communicate using any communication platforms and technologies suitable for transporting data and/or communication signals, including any known communication technologies, devices, media, and protocols supportive of remote data communications, examples of which will be described in more detail below with respect to FIG. 18. In some embodiments, the server(s) and/or client device(s) communicate via one or more networks. A network may include a single network or a collection of networks (such as the Internet, a corporate intranet, a virtual private network (VPN), a local area network (LAN), a wireless local network (WLAN), a cellular network, a wide area network (WAN), a metropolitan area network (MAN), or a combination of two or more such networks. The one or more networks will be discussed in more detail below with regard to FIG. 18.

The server(s) may include one or more hardware servers (e.g., hosts), each with its own computing resources (e.g., processors, memory, disk space, networking bandwidth, etc.) which may be securely divided between multiple customers (e.g., client devices), each of which may host their own applications on the server(s). The client device(s) may include one or more personal computers, laptop computers, mobile devices, mobile phones, tablets, special purpose computers, TVs, or other computing devices, including computing devices described below with regard to FIG. 18.

Figure 17:
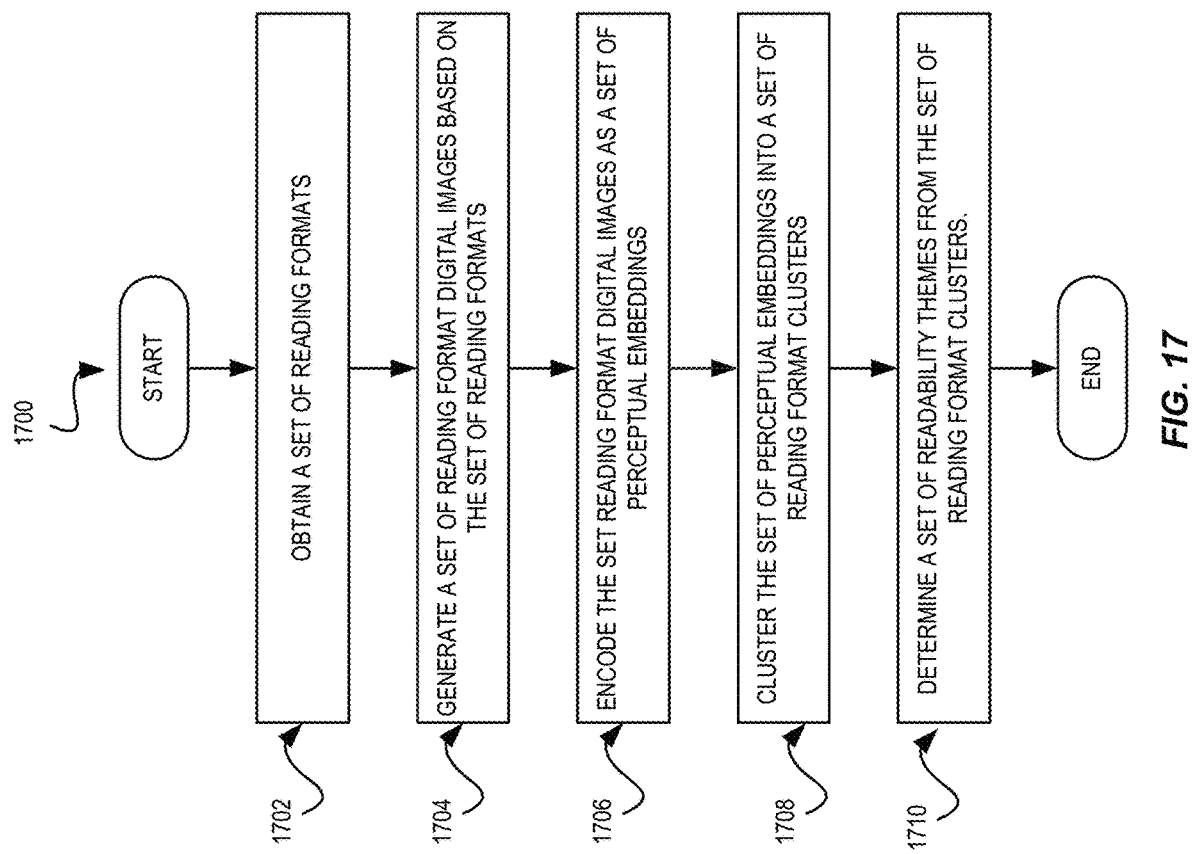
FIG. 17 illustrates a flowchart of a series of acts in a method for readability theme generation, according to an embodiment.

FIGS. 1-16, the corresponding text, and the examples, provide a number of different systems and devices that allows a user's input to be interpreted, predicting a user intent to generate a mask. In addition to the foregoing, embodiments can also be described in terms of flowcharts comprising acts and steps in a method for accomplishing a particular result. For example, FIG. 17 illustrates a flowchart of an exemplary method in accordance with one or more embodiments. The method described in relation to FIG. 17 may be performed with fewer or more steps/acts or the steps/acts may be performed in differing orders. Additionally, the steps/acts described herein may be repeated or performed in parallel with one another or in parallel with different instances of the same or similar steps/acts.

FIG. 17 illustrates a flowchart 1700 of a series of acts in a method of readability theme generation, in accordance with one or more embodiments. In one or more embodiments, the method 1700 is performed in a digital medium environment that includes the readability theme generation system 1600. The method 1700 is intended to be illustrative of one or more methods in accordance with the present disclosure and is not intended to limit potential embodiments. Alternative embodiments can include additional, fewer, or different steps than those articulated in FIG. 17.

As illustrated in FIG. 17, the method 1700 includes an act 1702 of obtaining a set of reading formats. Each reading format received can include a respective set of one or more text format settings. For example, the set of reading formats can be received from a set of reading devices used by a cohort users. The set of reading devices can include reading devices of different types (e.g., mobile and web). The cohort of users can include users of differing reading abilities. For example, the cohort of users can include any or all of: children learning to read, young professionals, old age readers, readers with dyslexia, reading without dyslexia or other reading disability, readers reading in a non-primary language to them, etc. In some embodiments, each reading format received includes any or all of: a respective font setting, a respective line spacing setting, a respective word spacing setting, or a respective character spacing setting.

The method 1700 also include an act of 1704 of generating a set of reading format digital images based on the set of reading formats. For example, the set of reading format digital images can be generated by output text for display in one or more virtual frame buffers where the text is formatted in accordance with the set of reading formats. A set of digital image screenshots of the text can be captured from the one or more virtual frame buffers. The set of reading format digital images can be extracted from the set of captured digital image screenshots. In some embodiments, each reading format digital image is a digital image crop extracted from a respective screenshot and the respective screenshot includes text formatted in accordance with one reading format. In some embodiments, in order to generate sufficient training data for the encoding act 1706, multiple screenshots are captured for each reading format and multiple digital image crops are extracted from each screenshot. In some embodiments, the size of a digital image crop is determined or selected based on a predetermined viewing distance and a predetermined visual angle. For example, the predetermined viewing distance can be a typical viewing distance of a user's eye from a reading device screen when reading text displayed on the screen and the predetermined visual angle can be a typical visual angle of a user when reading text displayed on a reading device screen at the typical viewing distance.

The method 1700 further includes the act of 1706 of encoding the set of reading format digital images (crops) as a set of perceptual embeddings. In some embodiments, this encoding includes inputting the set of reading format digital images to a trained convolutional neural network-based machine learning model and obtaining the set of perceptual embeddings as output produced by the trained model based on the input. The model can be trained in a supervised, semi-supervised, or unsupervised manner based on the set of reading format digital images.

The method 1700 also includes the act of 1708 of clustering the set of perceptual embeddings into a set of reading format clusters. In some embodiments, this clustering includes determining an optimal number of K clusters based on the set of perceptual embeddings. For example, the optimal number of K clusters can be determined based on clustering the set of perceptual embeddings into different candidate K number of clusters and evaluating the clusters formed for each candidate K according to one or more cluster quality metrics or techniques such as silhouette score or knee-point heuristics. The highest quality candidate K according to the one or more cluster quality metrics or techniques can be selected as the optimal K. The set perceptual embeddings are clustered into the optimal number of K clusters according to the similarity or distances (e.g., cosine distances).

The method 1700 further includes the act 1710 of determining a set of readability themes from the set of reading format clusters. For example, this determining can include determining the centroid of each reading format cluster. For each reading format cluster, the perceptual embedding in the cluster that is closest in distance (e.g., cosine distance) to the centroid is selected as the representative perceptual embedding for the cluster. The set of readability themes are determined from the set of representative perceptual embeddings determined for the set of reading format clusters. Each readability theme includes the text setting(s) of the reading format corresponding to the representative perceptual embedding from which the readability them is determined. For example, each readability theme may include a respective font setting, a respective line spacing setting, a respective word spacing setting, and a respective character spacing setting.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 18:
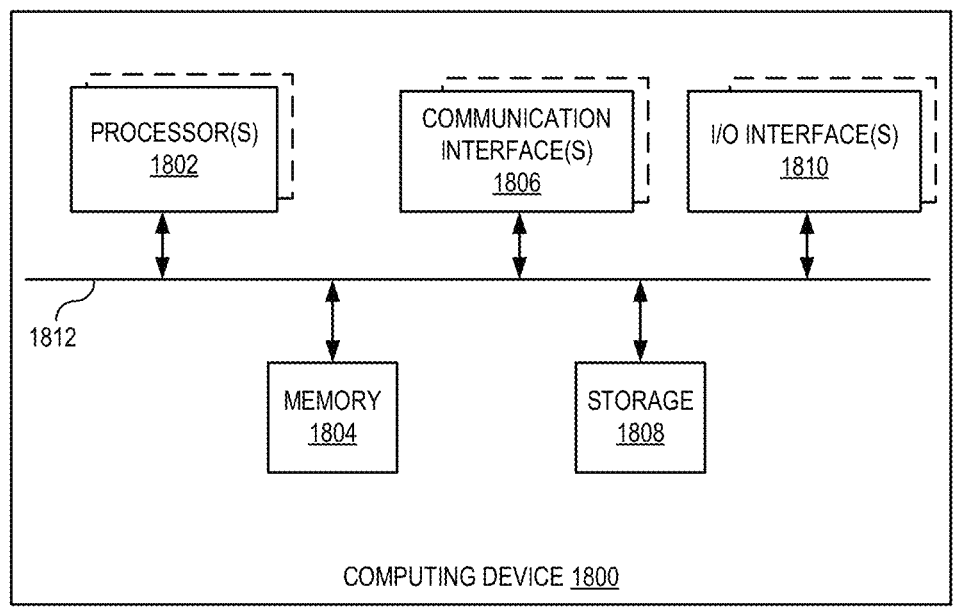
FIG. 18 illustrates a block diagram of an exemplary computing device, according to an embodiment.

FIG. 18 illustrates, in block diagram form, an exemplary computing device 1800 that may be configured to perform one or more of the processes described above. One will appreciate that one or more computing devices such as the computing device 1800 may implement the readability theme generation system 1600. As shown by FIG. 18, the computing device can comprise a processor 1802, memory 1804, one or more communication interfaces 1806, a storage device 1808, and one or more I/O devices/interfaces 1810. In certain embodiments, the computing device 1800 can include fewer or more components than those shown in FIG. 18. Components of computing device 1800 shown in FIG. 18 will now be described in additional detail.

In particular embodiments, processor(s) 1802 includes hardware for executing instructions, such as those making up a computer program. As an example, and not by way of limitation, to execute instructions, processor(s) 1802 may retrieve (or fetch) the instructions from an internal register, an internal cache, memory 1804, or a storage device 1808 and decode and execute them. In various embodiments, the processor(s) 1802 may include one or more central processing units (CPUs), graphics processing units (GPUs), field programmable gate arrays (FPGAs), systems on chip (SoC), or other processor(s) or combinations of processors.

The computing device 1800 includes memory 1804, which is coupled to the processor(s) 1802. The memory 1804 may be used for storing data, metadata, and programs for execution by the processor(s). The memory 1804 may include one or more of volatile and non-volatile memories, such as Random Access Memory ("RAM"), Read Only Memory ("ROM"), a solid-state disk ("SSD"), Flash, Phase Change Memory ("PCM"), or other types of data storage. The memory 1804 may be internal or distributed memory.

The computing device 1800 can further include one or more communication interfaces 1806. A communication interface 1806 can include hardware, software, or both. The communication interface 1806 can provide one or more interfaces for communication (such as, for example, packet-based communication) between the computing device and one or more other computing devices 1800 or one or more networks. As an example, and not by way of limitation, communication interface 1806 may include a network interface controller (NIC) or network adapter for communicating with an Ethernet or other wire-based network or a wireless NIC (WNIC) or wireless adapter for communicating with a wireless network, such as a WI-FI. The computing device 1800 can further include a bus 1812. The bus 1812 can comprise hardware, software, or both that couples components of computing device 1800 to each other.

The computing device 1800 includes a storage device 1808 includes storage for storing data or instructions. As an example, and not by way of limitation, storage device 1808 can comprise a non-transitory storage medium described above. The storage device 1808 may include a hard disk drive (HDD), flash memory, a Universal Serial Bus (USB) drive or a combination these or other storage devices. The computing device 1800 also includes one or more input or output ("I/O") devices/interfaces 1810, which are provided to allow a user to provide input to (such as user strokes), receive output from, and otherwise transfer data to and from the computing device 1800. These I/O devices/interfaces 1810 may include a mouse, keypad or a keyboard, a touch screen, camera, optical scanner, network interface, modem, other known I/O devices or a combination of such I/O devices/interfaces 1810. The touch screen may be activated with a stylus or a finger.

The I/O devices/interfaces 1810 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O devices/interfaces 1810 is configured to provide graphical data to a display for presentation to a user. The graphical data may be representative of one or more graphical user interfaces and/or any other graphical content as may serve a particular implementation.

In the foregoing specification, embodiments have been described with reference to specific exemplary embodiments thereof. Various embodiments are described with reference to details discussed herein, and the accompanying drawings illustrate the various embodiments. The description above and drawings are illustrative of one or more embodiments and are not to be construed as limiting. Numerous specific details are described to provide a thorough understanding of various embodiments.

Embodiments may include other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

In the various embodiments described above, unless specifically noted otherwise, disjunctive language such as the phrase "at least one of A, B, or C," is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

We claim:
1. A method comprising:
obtaining a plurality of reading formats;
generating a plurality of reading format digital images based on the plurality of reading formats;
inputting the plurality of reading format digital images to a trained machine learning model, wherein the trained machine learning model includes a trained convolutional neural network-based machine learning model;
encoding, using the trained convolutional neural network-based machine learning model, the plurality of reading format digital images as a plurality of perceptual embeddings;
clustering the plurality of perceptual embeddings into a plurality of reading format clusters by:
determining an optimal number of clusters based on one or more clustering quality metrics that measure a similarity of perceptual embeddings in each cluster, and clustering the plurality of perceptual embeddings into the optimal number of clusters; and determining a set of readability themes based on the plurality of reading format clusters, wherein each readability theme is based on a representative perceptual embedding of a corresponding reading format cluster.

2. The method of claim 1, further comprising:

providing graphical user interface controls in a graphical user interface, the graphical user interface controls for selecting a readability theme from among the set of readability themes to apply to text of a document.

3. The method of claim 1, wherein obtaining the plurality of reading formats is based on:

receiving the plurality of reading formats from a plurality of reading devices used by a cohort of users.

4. The method of claim 1, wherein generating the plurality reading format digital images based on the plurality of reading formats is based on:

outputting text for display in a virtual frame buffer;

capturing, from one or more virtual frame buffers, a set of digital image screenshots of text formatted in accordance with the plurality of reading formats; and extracting the plurality of reading format digital images from the set of digital image screenshots.

5. The method of claim 1, wherein the trained machine learning model comprises a trained convolutional neural network-based machine learning model, and wherein encoding, using the trained machine learning model, the plurality of reading format digital images as the plurality of perceptual embeddings is based on:

inputting the plurality of reading format digital images to the trained convolutional neural network-based machine learning model; and obtaining the plurality of perceptual embeddings from the trained convolutional neural network-based machine learning model.

6. The method of claim 1, wherein the trained machine learning model comprises a trained convolutional neural network-based machine learning model; and wherein encoding, using the trained machine learning model, the plurality of reading format digital images as the plurality of perceptual embeddings is based on:

training the convolutional neural network-based machine learning model to generate the plurality of perceptual embeddings based on the plurality of reading format digital images.

7. The method of claim 1, wherein clustering the plurality of perceptual embeddings into the plurality of reading format clusters is based on:

determining an optimal number of K clusters based on the plurality of perceptual embeddings; and clustering the plurality of perceptual embeddings into K clusters.

8. The method of claim 1, wherein determining the set of readability themes based on the plurality of reading format clusters is based on:

determining a respective centroid of each reading format cluster of the plurality of reading format clusters;

selecting a respective perceptual embedding from each reading format cluster of the plurality of reading format clusters based on the respective centroid determined for the reading format cluster; and determining a respective readability theme for each reading format cluster of the plurality of reading format clusters based on the respective perceptual embedding selected from the reading format cluster.

9. The method of claim 1, wherein a reading format image of the plurality of reading format images has a size determined based on a predetermined viewing distance and a predetermined visual angle.

10. The method of claim 1, wherein a reading format of the plurality of reading formats comprises a font identifier, a line spacing setting, a character spacing setting, and a word spacing setting.

11. The method of claim 1, wherein:

each reading format digital image of the plurality of reading format digital images depicts text formatted in accordance with a respective reading format of the plurality of readings formats; and wherein text depicted in the plurality of reading format digital images has a same font size across the plurality of reading format digital images and is normalized for x-height across the plurality of reading format digital images.

12. A system comprising:

one or more memory components; and one or more processing devices coupled to the one or more memory components, the one or more processing devices to perform operations comprising:

obtaining a plurality of reading formats;

generating a plurality of reading format digital images based on the plurality of reading formats;

inputting the plurality of reading format digital images to a trained machine learning model, wherein the trained machine learning model includes a trained convolutional neural network-based machine learning model;

encoding, using the trained convolutional neural network-based machine learning model, the plurality of reading format digital images as a plurality of perceptual embeddings;

clustering the plurality of perceptual embeddings into a plurality of reading format clusters by:

determining an optimal number of clusters based on one or more clustering quality metrics that measure a similarity of perceptual embeddings in each cluster, and clustering the plurality of perceptual embeddings into the optimal number of clusters; and determining a set of readability themes based on the plurality of reading format clusters, wherein each readability theme is based on a representative perceptual embedding of a corresponding reading format cluster.

13. The system of claim 12, the one or more processing devices to further perform operations comprising:

providing graphical user interface controls in a graphical user interface, the graphical user interface controls for selecting a readability theme from among the set of readability themes to apply to text of a document.

14. The system of claim 12, wherein obtaining the plurality of reading formats is based on:

receiving the plurality of reading formats from a plurality of reading devices used by a cohort of users.

15. A non-transitory computer-readable medium storing executable instructions, which when executed by a processing device, cause the processing device to perform operations comprising:

receiving a plurality of readability themes, wherein the plurality of readability themes is generated based on:

inputting a plurality of reading format digital images to a trained machine learning model, wherein the trained machine learning model includes a trained convolutional neural network-based machine learning model;

encoding, using the trained convolutional neural network-based machine learning model, the plurality of reading format digital images as a plurality of perceptual embeddings;

clustering the plurality of perceptual embeddings into a plurality of reading format clusters by:

determining an optimal number of clusters based on one or more clustering quality metrics that measure a similarity of perceptual embeddings in each cluster, and clustering the plurality of perceptual embeddings into the optimal number of clusters; and determining the plurality of readability themes based on the plurality of reading format clusters, wherein each readability theme is based on a representative perceptual embedding of a corresponding reading format;

displaying at least a portion of a document;

providing graphical user interface controls for selecting one readability theme from a plurality of readability themes;

receiving a selection of a particular readability theme via the graphical user interface controls; and displaying text of the document in accordance with the particular readability theme.

16. The non-transitory computer-readable medium of claim 15, wherein each readability theme of the plurality of readability themes comprises a respective bundle of one or more text format settings.

17. The non-transitory computer-readable medium of claim 15, wherein the instructions, when executed by the processing device, cause the processing device to further perform operations comprising:

providing additional graphical user interface controls for individually selecting a text format setting that is specified by the particular readability theme.

18. The non-transitory computer-readable medium of claim 15, wherein the instructions, when executed by the processing device, cause the processing device to further perform operations comprising:

providing a plurality of graphical user interface controls for individually selecting a plurality of text format settings;

sending the plurality of text format settings to a server; and wherein the plurality of readability themes is generated based on the plurality of text format settings.

19. The non-transitory computer-readable medium of claim 15, wherein:

the plurality of readability themes comprises a first readability theme, a second readability theme, and a third readability theme;

a line spacing, a word spacing, and a character spacing specified by the third readability theme are greater respectively than a line spacing, a word spacing, and a character spacing specified by the second readability theme; and the line spacing, the word spacing, and the character spacing specified by the second readability theme are greater respectively than a line spacing, a word spacing, and a character spacing specified by the first readability theme.

20. The non-transitory computer-readable medium of claim 15, wherein the instructions, when executed by the processing device, cause the processing device to further perform operations comprising:

displaying text of the document in accordance with a font, a line spacing, a word spacing, and a character spacing specified by the particular readability theme.

* * * * *